US012452937B2

(12) United States Patent
Lee et al.

(10) Patent No.: US 12,452,937 B2
(45) Date of Patent: Oct. 21, 2025

(54) ELECTRONIC DEVICE AND METHOD FOR CONNECTING THE SAME TO EXTERNAL DEVICE THEREOF

(71) Applicant: Samsung Electronics Co., Ltd., Gyeonggi-do (KR)

(72) Inventors: Jaehyeok Lee, Gyeonggi-do (KR); Taikuin Mun, Gyeonggi-do (KR); Jaehoon Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 432 days.

(21) Appl. No.: 17/883,860

(22) Filed: Aug. 9, 2022

(65) Prior Publication Data
US 2023/0050589 A1 Feb. 16, 2023

Related U.S. Application Data

(63) Continuation of application No. PCT/KR2022/011445, filed on Aug. 3, 2022.

(30) Foreign Application Priority Data

Aug. 10, 2021 (KR) .................. 10-2021-0105314

(51) Int. Cl.
H04W 76/14 (2018.01)
H04W 4/80 (2018.01)
(Continued)

(52) U.S. Cl.
CPC ............ *H04W 76/14* (2018.02); *H04W 4/80* (2018.02); *H04W 76/11* (2018.02); *H04W 76/18* (2018.02)

(58) Field of Classification Search
CPC ....... H04W 76/14; H04W 4/80; H04W 76/11; H04W 76/18; H04W 4/02; H04W 8/24;
(Continued)

(56) References Cited

U.S. PATENT DOCUMENTS 8,886,118 B2 11/2014 Reuss et al.
10,158,988 B2 12/2018 Lalwaney
(Continued)

FOREIGN PATENT DOCUMENTS

CN 106528191 A * 3/2017
CN 110138965 A * 8/2019 ........ H04M 1/72412
(Continued)

OTHER PUBLICATIONS

Townsend et al. Getting started with Bluetooth Low Energy, Oreilly, 2015 (Year: 2015).*
(Continued)

*Primary Examiner* — Ayaz R Sheikh
*Assistant Examiner* — David Zhijun Sun
(74) *Attorney, Agent, or Firm* — Cha & Reiter, LLC.

(57) ABSTRACT

Electronic devices are disclosed herein. Each device includes a display, communication circuitry and a processor. For each device, the respective processor executes registering a geographic locale indicator for the electronic device via a universally unique identified (UUID), equipment identity register (EIR) or manufacturer information. For a first device, a setup mode is executed, including transmitting the UUID, EIR, or manufacturer information to a second device, which may then determine is communication is possible with the first device based on the geographic locale indicator. The first device may receive a response indicative of whether the locales between the devices match. Based on the same, the first and/or second device may also display an indication as to whether communication is possible with the second device.

17 Claims, 19 Drawing Sheets

(51) Int. Cl.
*H04W 76/11* (2018.01)
*H04W 76/18* (2018.01)

(58) Field of Classification Search
CPC ..... H04W 76/00; H04W 88/02; H04W 84/18; H04W 4/20
See application file for complete search history.

(56) References Cited

U.S. PATENT DOCUMENTS

| | | | |
|---|---|---|---|
| 10,809,389 | B2 | 10/2020 | Beristain et al. |
| 10,880,741 | B2 | 12/2020 | Zarakas et al. |
| 11,063,899 | B1 * | 7/2021 | Solodnik ............ H04L 61/4541 |
| 11,197,347 | B2 | 12/2021 | Park et al. |
| 11,856,498 | B2 | 12/2023 | Liu |
| 2017/0289615 | A1 * | 10/2017 | Kobayashi ........... H04N 21/242 |
| 2018/0368197 | A1 * | 12/2018 | Zeilingold ............. G16H 40/63 |

FOREIGN PATENT DOCUMENTS

| | | | | |
|---|---|---|---|---|
| CN | 110620995 | A | | 12/2019 |
| CN | 106507413 | B | | 4/2020 |
| CN | 111542031 | A * | 8/2020 | ............. H04W 4/80 |
| CN | 106792493 | B | | 9/2020 |
| EP | 3172909 | B1 | | 5/2018 |
| EP | 2991041 | B1 * | 7/2020 | ............. G07B 15/02 |
| JP | 2021-27479 | A | | 2/2021 |
| KR | 10-2007-0050134 | A | | 5/2007 |
| KR | 10-2015-0058899 | A | | 5/2015 |
| KR | 10-2018-0087288 | A | | 8/2018 |
| KR | 10-2020-0017302 | A | | 2/2020 |
| KR | 10-2020-0122859 | A | | 10/2020 |
| WO | 2020/132922 | A1 | | 7/2020 |
| WO | WO-2021054488 | A1 * | 3/2021 | |

OTHER PUBLICATIONS

International Search Report dated Nov. 3, 2022.
Partial Supplementary European Search Report dated Apr. 23, 2024.
Extended European Search Report dated Jul. 8, 2024.

* cited by examiner

ELECTRONIC DEVICE AND METHOD FOR CONNECTING THE SAME TO EXTERNAL DEVICE THEREOF

CROSS-REFERENCE TO RELATED APPLICATION(S)

This application is a continuation of International Application No. PCT/KR2022/011445, which was filed on Aug. 3, 2022, and claims priority to Korean Patent Application No. 10-2021-0105314, filed on Aug. 10, 2021, in the Korean Intellectual Property Office, the disclosures of which are incorporated by reference herein their entirety.

BACKGROUND

Technical Field

This disclosure relates to establishing communication between electronic devices, and more particular to communication operations between incompatible devices.

Background Art

In recent times, there has been rapid increase in usage and popularity of portable electronic devices such as smartphones or wearable devices (e.g., watches, buds). With the growth of these portable electronic devices, there has also been development of a variety of functions executable by and provided by these portable electronic devices.

An electronic device, such as a smartphone, may transceive communication, such as phone calls, along with other diverse types of information, with other electronic devices. Some portable electronic devices may also be wearable, so as to be affixed on a body of a user, allowing identification of diverse user-related information (e.g., biometrics, movement, location) for provision through the smartphone.

Further, technology referred to as the "Internet-of-things" (IoT) has become more widespread in recent times. IoT involves connecting a diversity of smart devices into a network via short-range communication to transmit and receive signals, information, or the like. With the advancement of IoT technology, some useability challenges have been encountered. For example, the operations of forming initial connections between IoT devices, and/or restoring connections between the IoT devices may be quite cumbersome, and result in a deleterious impact on user usability.

Some mobile terminal in some geographic regions (e.g., China) are not compliant with Global Mobile Service (GMS) components and/or software. Thus, such mobile terminals may be unable to connect to certain operational frameworks, applications and contexts (e.g., such as Google Wear OS). Accordingly, these mobile terminals may be limited to connecting only to certain devices (e.g., wearable devices) that are produced from their own locales. In some cases, when a cross-connection between a non-GMS device and a GMS device is attempted, the devices will indicate successful connection. However, in reality, the connection is not actually operable. This may confuse and misinform users, and the users may be frustrated at the lack of functionality, and/or futilely attempt to repair the connection.

In addition, when connecting data interfaces between, for example, a portable mobile terminal and wearable device, language information on a universally unique identifier (UUID) of the wearable device may be transmitted to the mobile terminal. In this case, the language information on the UUID includes information that affects entire processes of the mobile terminal. As such, when the corresponding information is applied, the entire process may be reset, and the connection between the mobile terminal and the wearable device may be lost, resulting in inconvenience to the user.

Further, during this connection, when the wearable device is reset and the mobile device is not, it may be difficult for the mobile terminal to recognize that the wearable device has reset. In this case, to reconnect the wearable device and the mobile terminal, the mobile terminal will need to be reset and the connection process must be re-performed. The mobile terminal may fail to recognize that the wearable device has been reset, and may thus be unable to reperform the connection process.

Conversely, in a state where the wearable device and the mobile terminal are connected, when an attempt is made to connect the wearable device to a new mobile terminal without terminating the existing connection, because the BLE (Bluetooth low energy) address is different, the wearable device may be discovered, but may fail to achieve connection with the new mobile terminal.

SUMMARY

An electronic device according to certain embodiments includes a display; a communication module; and a processor, wherein the processor is configured to: register a geographic locale of the electronic device in at least one of a universally unique identifier (UUID), an equipment identity register (EIR), or a manufacturer information of the electronic device; execute a setup mode, including transmitting, via the communication module, the at least one of the UUID, the EIR, and the manufacturer information to an external device; receive from the external device a confirmation whether connection is possible based on the transmitted at least one of the UUID, EIR, and the manufacturer information including the registered geographic locale; and display a guide indicating whether connection is possible based on the received confirmation.

An electronic device according to certain embodiments includes a display; a communication module; and a processor, wherein the processor is configured to: when attempting to communicatively connect to an external device, receive at least one of a universally unique identifier (UUID), an equipment identity register (EIR), and a manufacturer information of the external device via the communication module; extract locale information for the external device, from the at least one of the universally unique identifier (UUID), equipment identity register (EIR), or manufacturer information; determine whether communicative connection is possible with the external device based on a comparison of the extracted locale information of the external device, and a stored locale information of the electronic device; and display, via a display, a guide indicating whether communicative connection with the external device is possible.

An electronic device according to certain embodiments includes: a communication module; and a processor, wherein the processor is configured to: transmit a connection request to an external device via the communication module; based on detecting that a Bluetooth low-energy (BLE) communicative connection is established with the external device, search for a service; after detecting the service, executing the service to identify whether a universally unique identifier (UUID) of the external device is of a first type that is registered during initial setup of the external device, or of a second type registered during normal usage of the external device; and when the UUID of the external device corresponds to the first type, determine that the external device is presently operating in an initial setup mode.

An electronic device according to certain embodiments includes: a communication module; and a processor, wherein the processor is configured to: execute a search for an external device with which to attempt a pairing operation; and after detecting an external device via the search, determine that the detected external device is communicable via Bluetooth low-energy (BLE), and that a basic rate/enhanced data rate (BR/EDR) address of the external device is undiscoverable; and based on the determination, transmit to the external device a request to reset a connection state.

According to certain embodiments, when an attempt is made to connect devices for the first time, based on the information discovered and obtained, it is possible to recognize that they are devices that cannot be connected to each other, which can prevent unnecessary APK download and connection operation and can guide the user in advance so that the user does not perform an unnecessary connection process.

According to certain embodiments, the information that affects the entire process and causes disconnection (e.g., language information) is transmitted in advance before data interfaces between devices are connected, so that it is possible to prevent immediate disconnection after connection establishment between devices.

According to certain embodiments, by recognizing a reset of the wearable device, the mobile terminal can be controlled to be reset and then perform the process from the initial connection step again, so that it is possible to resolve the inconvenience that the wearable device can be discovered but cannot be connected.

According to certain embodiments, when the wearable device is to be connect to a new mobile terminal, the wearable device is automatically reset and a new connection is established between the devices, so that it is possible to resolve the inconvenience that the wearable device can be discovered but cannot be connected.

DETAILED DESCRIPTION

Figure 1:
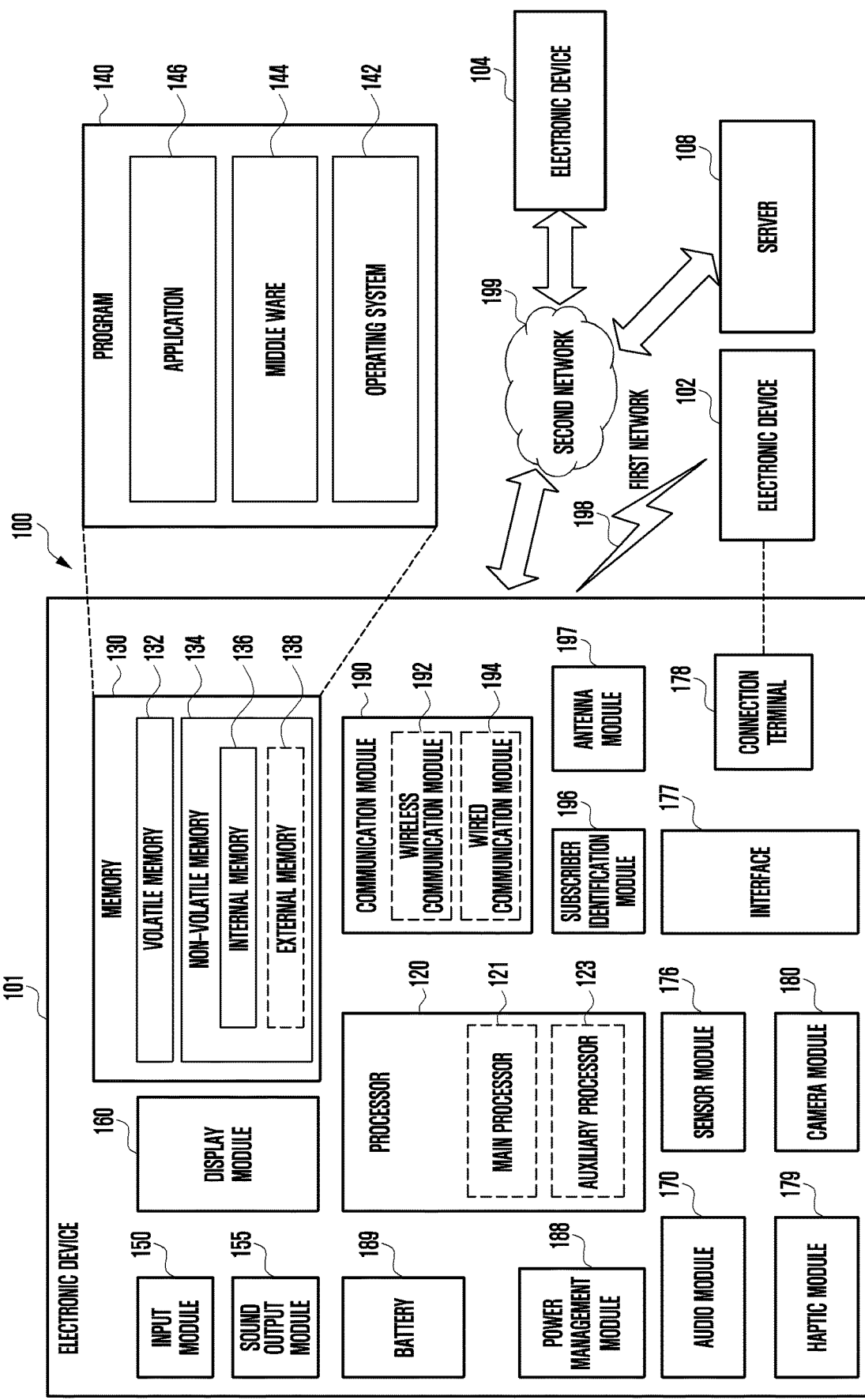
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
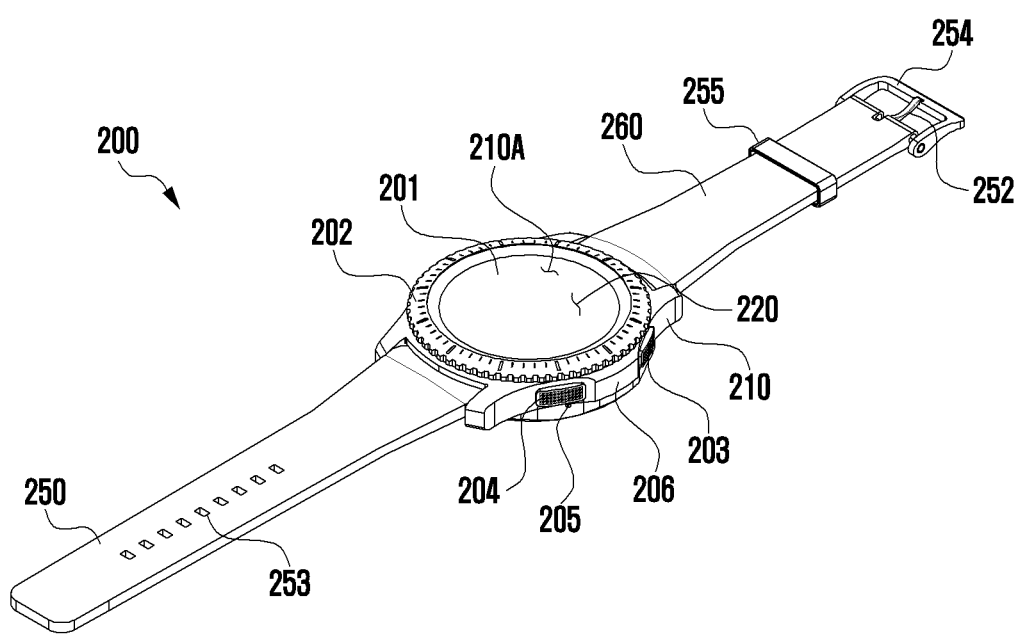
FIG. 2A is a front perspective view of an electronic device according to certain embodiments.
Figure 2B:
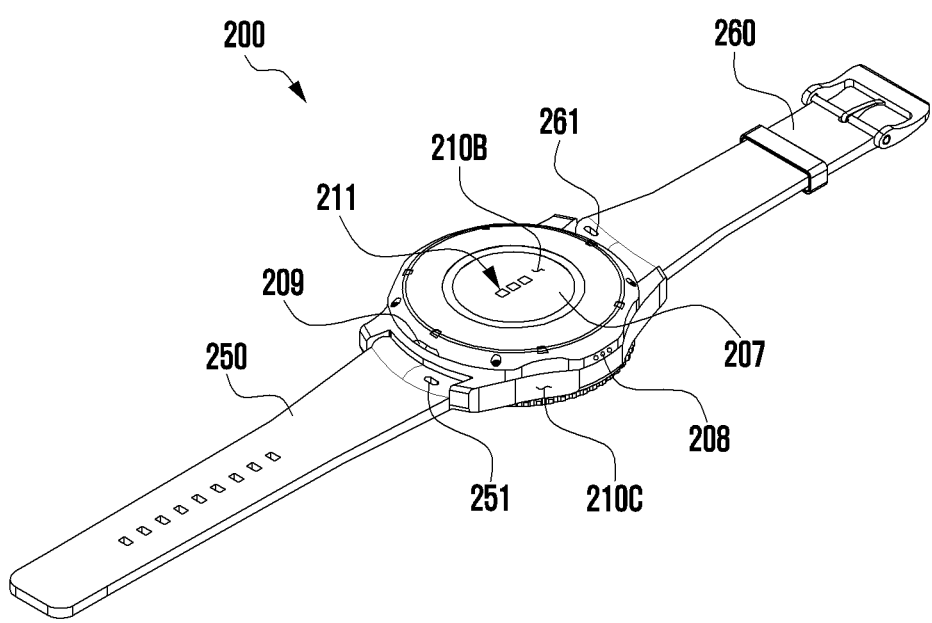
FIG. 2B is a rear perspective view of the electronic device according to certain embodiments.

FIG. 2A is a front perspective view of an electronic device according to certain embodiments, and FIG. 2B is a rear perspective view of the electronic device according to certain embodiments.

With reference to FIGS. 2A and 2B, the electronic device 200 (e.g., electronic device 101 in FIG. 1) according to certain embodiments may include: a housing 210 including a first surface (or, front surface) 210A, a second surface (or, rear surface) 210B, and a side surface 210C surrounding the space between the first surface 210A and the second surface 210B; and fastening members 250 and 260 (e.g., strap, connection member, or coupling member) connected to at least a portion of the housing 210 and configured to detachably fasten the electronic device 200 to a body part (e.g., wrist, ankle, neck, waist, or head) of the user. In another embodiment (not shown), the housing may refer to a structure forming some of the first surface 210A, the second surface 210B, and the side surface 210C in FIG. 2.

According to an embodiment, the first surface 210A may be formed by a front plate 201 that is substantially transparent at least in part (e.g., glass plate containing various coating layers, or polymer plate). The second surface 210B may be formed by a rear plate 207 that is substantially opaque. The rear plate 207 may be made of, for example, coated or colored glass, ceramic, polymer, metal (e.g., aluminum, stainless steel (STS), or magnesium), or a combination thereof. The side surface 210C is coupled to the front plate 201 and the rear plate 207 and may be formed by a side bezel structure (or, side member) 206 containing metal and/or polymer. In a certain embodiment, the rear plate 207 and the side bezel structure 206 may be integrally formed and contain the same material (e.g., metal material such as aluminum). The fastening members 250 and 260 may be made of various materials and formed in various shapes. The fastening members 250 and 260 may be formed as a single body or as plural unit links that are movable with each other, by woven material, leather, rubber, urethane, metal, ceramic, or a combination thereof.

According to certain embodiments, the electronic device 200 may include at least one of a display 220 (e.g., display module 160 in FIG. 1), an audio module (205, 208) (e.g., audio module in FIG. 1), a sensor module 211 (e.g., sensor module 176 in FIG. 1), key input devices 202, 203 and 204

(e.g., input module 150 in FIG. 1), or a connector hole 209. In a certain embodiment, at least one of the components (e.g., key input device 202, 203 or 204, connector hole 209, and sensor module 211) may be removed from the electronic device 200, or a different component may be added to the electronic device 200.

The display 220 can be exposed through, for example, a significant portion of the front plate 201. The display 220 may have a shape corresponding to the shape of the front plate 201 and may be in various shapes such as a circle, an ellipse, and a polygon. The display 220 may be disposed in combination with or adjacent to a touch sensing circuit, a pressure sensor capable of measuring the intensity (pressure) of a touch, and/or a fingerprint sensor.

The audio module (205, 208) may include a microphone hole 205 and a speaker hole 208. In the microphone hole 205, a microphone for picking up external sounds may be disposed therein, and plural microphones may be arranged to sense the direction of sound in a certain embodiment. The speaker hole 208 can be used for an external speaker and a call receiver.

The sensor module 211 may generate an electrical signal or data value corresponding to an internal operating state of the electronic device 200 or an external environmental state. The sensor module 211 may include, for example, a biometric sensor module 211 (e.g., heart rate monitoring (HRM) sensor) disposed on the second surface 210B of the housing 210. The electronic device 200 may further include a sensor module (not shown) including at least one of, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 202, 203 and 204 may include a wheel key 202 disposed on the first surface 210A of the housing 210 and rotatable in at least one direction, and/or side key buttons 202 and 203 disposed on the side surface 210C of the housing 210. The wheel key may have a shape corresponding to the shape of the front plate 201. In another embodiment, the electronic device 200 may not include some or all of the key input devices 202, 203 and 204 described above, and the key input device 202, 203 or 204 that is not included may be implemented in other forms, such as soft keys, on the display 220. The connector hole 209 may accommodate a connector (e.g., USB connector) for transmitting and receiving power and/or data to and from an external electronic device, and may include another connector hole (not shown) that can accommodate a connector for transmitting and receiving an audio signal to and from an external electronic device. The electronic device 200 may further include, for example, a connector cover (not shown) that covers at least a portion of the connector hole 209 and blocks foreign substances from entering the connector hole.

The fastening members 250 and 260 may be detachably fastened to at least a portion of the housing 210 by using locking members 251 and 261. The fastening members 250 and 260 may include one or more of a fixing member 252, fixing member fastening holes 253, a band guide member 254, and a band fixing ring 255.

The fixing member 252 may be formed to fix the housing 210 and the fastening members 250 and 260 to a body part (e.g., wrist, ankle, neck, waist, or head) of the user. The fixing member fastening holes 253 may fix the housing 210 and the fastening members 250 and 260 to a body part of the user in correspondence to the fixing member 252. The band guide member 254 may be formed to limit the range of movement of the fixing member 252 when the fixing member 252 engages with a fixing member fastening hole 253, so that the fastening members 250 and 260 may be fastened in close contact to a body part of the user. The band fixing ring 255 may limit the range of movement of the fastening members 250 and 260 while the fixing member 252 and the fixing member fastening hole 253 are fastened.

Figure 3:
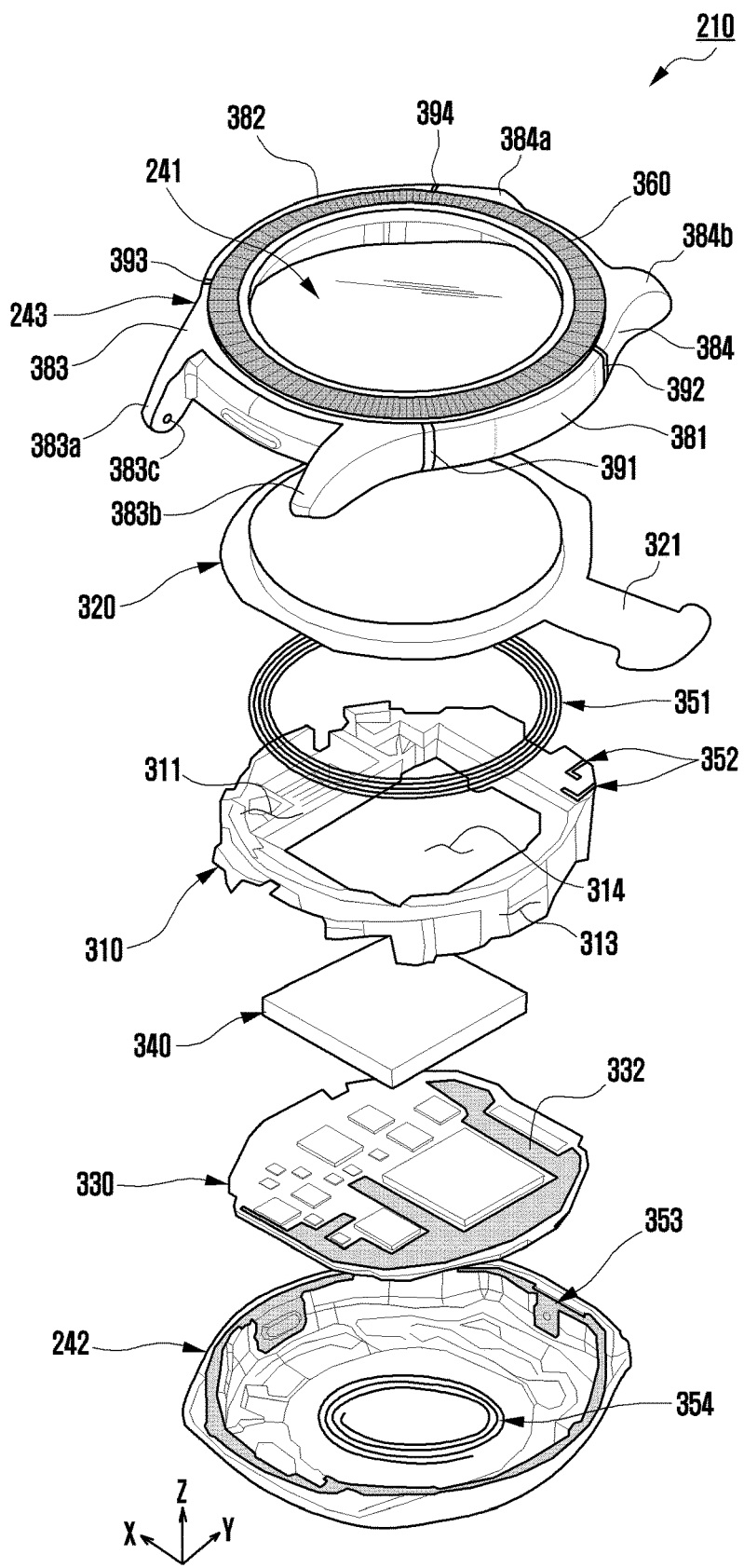
FIG. 3 is an exploded perspective view of a main body 210 of the electronic device 200 in FIG. 2A according to an embodiment.

FIG. 3 is an exploded perspective view of the electronic device 200 in FIG. 2A according to an embodiment.

With reference to FIG. 3, the electronic device 200 may include a front cover 241, a rear cover 242, a side member 243, a support member (e.g., bracket) 310, a display 320, a printed circuit substrate 330, a battery 340, or plural conductive patterns 351, 352, 353 and 354.

According to an embodiment, the support member 310 may be disposed between the front cover 241 and the rear cover 242. The display 320 may be disposed on one surface 311 of the support member 310 facing the front cover 241. The printed circuit board 330 may be disposed on the other surface (not shown) of the support member 310 facing the rear cover 242. The display 320 and the printed circuit board 330 may be supported by the support member 310 to ensure rigidity. The support member 310 may be formed of, for example, a metal material and/or a non-metal material (e.g., polymer).

According to an embodiment, the display 320 may be disposed between the front cover 241 and the support member 310. The display 320 may be implemented based on various light emitting elements such as organic light-emitting diodes (OLEDs). According to certain embodiments (not shown), the display 320 may include a touch sensing circuit (e.g., touch sensor). The touch sensing circuit may be implemented with a transparent conductive layer (or film) based on various conductive materials such as indium tin oxide (ITO). According to an embodiment, the touch sensing circuit may be disposed between the front cover 241 and a polarization layer (not shown) (e.g., add-on type). According to another embodiment, the touch sensing circuit may be disposed between a polarization layer and a light emitting layer (e.g., a layer including plural pixels implemented with light emitting elements such as OLEDs (e.g., on-cell type). According to another embodiment, the light emitting layer may include a touch sensing circuit or a touch sensing function (e.g., in-cell type). According to certain embodiments (not shown), the display 320 may further include a pressure sensor capable of measuring the intensity (pressure) of a touch.

According to an embodiment, the display 320 may include an electrical path such as a flexible printed circuit (FPCB) 321 for electrical connection with the printed circuit board 330. For example, the FPCB 321 may be disposed in a bended form between a side surface 313 of the support member 310 and the side member 243 so as to be electrically connected to the printed circuit board 330. A processor, a memory, and/or an interface may be mounted on the printed circuit board 330. The processor may include, for example, one or more of a central processing unit, an application processor, a graphics processing unit, an image signal processor, a sensor hub processor, or a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may electrically or physically connect, for example, the main body 210 to an external electronic device, and may include a USB connector, an SD card/MMC connector, or an audio connector. For example, a connector hole for electrical connection with an external electronic device may be formed in the side member 243 or the rear cover 242.

Hereinafter, in this disclosure, a parent terminal (e.g., smartphone) of a wearable device is defined as a first electronic device or a mobile terminal, and a wearable device (e.g., smartwatch) used by being connected through Bluetooth to a parent terminal is defined as a second electronic device or a wearable device.

In certain embodiments of this disclosure, the first electronic device (e.g., electronic device 101 in FIG. 1) may be implemented with a portable electronic device such as a smartphone or a tablet PC, and the second electronic device (e.g., electronic device 200 in FIG. 2) may be implemented with a wearable device such as a smartwatch.

Figure 4:
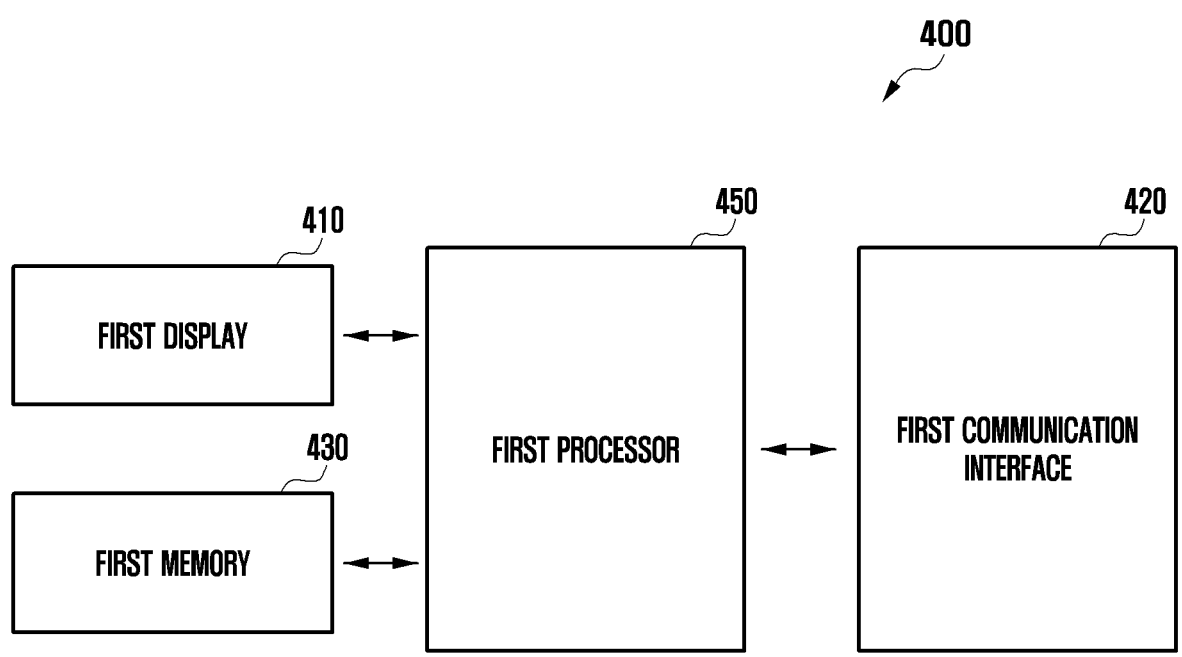
FIG. 4 is a block diagram of a first electronic device according to certain embodiments.

FIG. 4 is a block diagram of the first electronic device according to certain embodiments.

With reference to FIG. 4, the first electronic device 400 includes a first display 410, a first communication interface 420, a first memory 430, and a first processor 450, and may implement certain embodiments of this disclosure even if at least some of the illustrated components are omitted and/or substituted. The first electronic device 400 may further include at least some of the components and/or functions of the electronic device 101 in FIG. 1.

Some of the components shown in FIG. 4 and/or other components of the first electronic device 400 that are not shown (e.g., first processor 450, memory 430, first communication interface 420) may be disposed inside the housing (not shown) of the first electronic device 400, and some other components (e.g., first display 410, first communication interface 420) may be exposed at least partly to the outside of the housing.

According to certain embodiments, the first display 410 displays an image, and may be implemented with, but not limited to, one of liquid crystal display (LCD), light-emitting diode (LED) display, organic light-emitting diode (OLED) display, or micro electro mechanical systems (MEMS) display, and electronic paper display 320. According to certain embodiments, the first display 410 may be a foldable display (e.g., in-foldable display, out-foldable display) whose at least a portion can be folded, or a rollable display whose at least a portion can be wound. Alternatively, the first electronic device 400 may include two or more independent displays. The first display 410 may include at least some of the configurations and/or functions of the display module 160 in FIG. 1.

According to certain embodiments, the first communication interface 420 may support a wired or wireless communication connection with an external device (e.g., second electronic device 200 in FIG. 2), and the first electronic device 400 may include one of a wired communication interface and a wireless communication interface.

For example, the first communication interface 420 may include, as an example of a wired communication interface (e.g., interface 177 in FIG. 1), a high definition multimedia interface (HDMI) and a universal serial bus (USB) interface. Further, the first communication interface 420 may include a wireless communication module (e.g., wireless communication module 192 in FIG. 1) supporting a short-range communication module with an external device. The wireless communication module can support various short-range wireless communication schemes (e.g., Wi-Fi, Bluetooth, Bluetooth low energy (BLE)), and may include independent hardware and/or software configurations to support individual wireless communication schemes.

According to certain embodiments, the first memory 430 is for temporarily or permanently storing non-limited digital data, and may include at least one of the configurations and/or functions of the memory 130 in FIG. 1. The first memory 430 may include a volatile memory such as one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD), and a volatile memory such as dynamic RAM (DRAM), static RAM (SRAM), or synchronous dynamic RAM (SDRAM).

The first memory 430 may store various instructions that may be executed by the first processor 450. Such instructions may include arithmetic and logical operations, and/or various control operations including data movement, and input and output, which can be recognized by the first processor 450.

According to certain embodiments, the first processor 450 is a component (e.g., application processor) capable of performing operations or data processing related to control and/or communication of individual components of the first electronic device 400, and may include at least some of the configurations and/or functions of the processor 120 in FIG. 1. The first processor 450 may be operably, functionally, and/or electrically connected to the components of the first electronic device 400 including the first display 410, the first communication interface 420, and the first memory 430.

According to certain embodiments, although there is no limitation on the operations and data processing functions that the first processor 450 can implement on the first electronic device 400, this disclosure will describe certain embodiments regarding connection and data exchange between devices. The operations of the first processor 450 to be described later can be carried out by executing instructions stored in the first memory 430.

Figure 5:
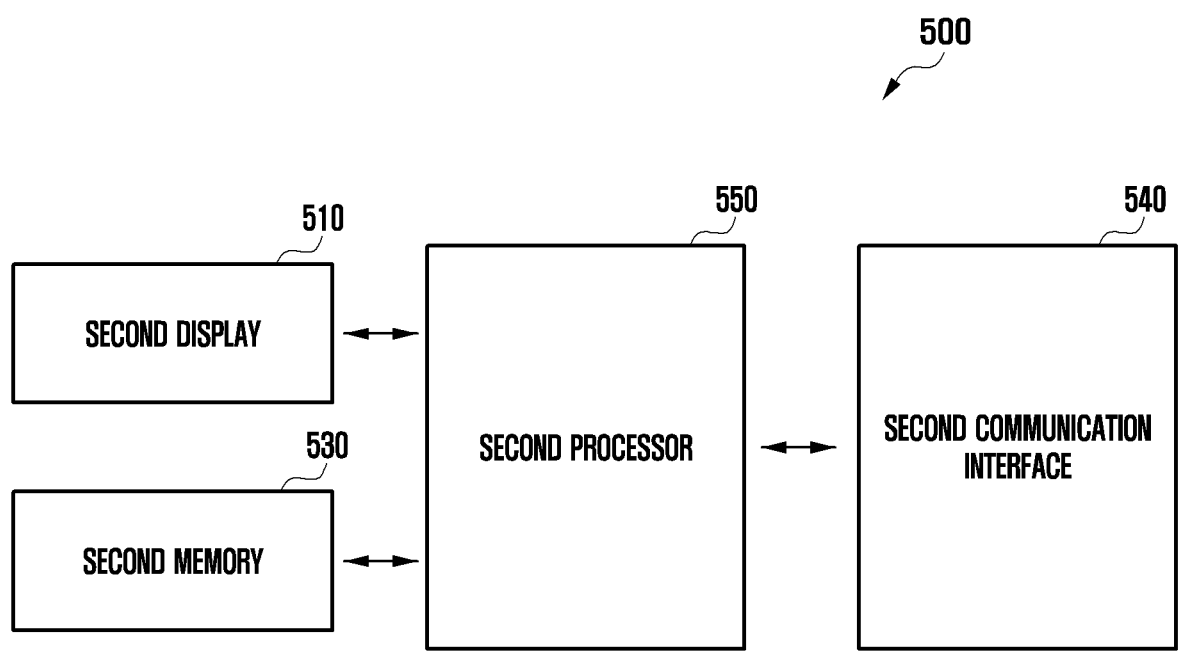
FIG. 5 is a block diagram of a second electronic device according to certain embodiments.

FIG. 5 is a block diagram of the second electronic device according to certain embodiments.

With reference to FIG. 5, the second electronic device 500 includes a second display 510, a second communication interface 540, a second memory 530, and a second processor 550, and may implement certain embodiments of this disclosure even if at least some of the illustrated components are omitted and/or substituted. The second electronic device 500 may further include at least some of the components and/or functions of the electronic device 200 in FIG. 2.

According to certain embodiments, the second communication interface 540 may support wireless connection with the first communication interface of the first electronic device.

According to certain embodiments, the second memory 530 may include a non-volatile memory and a volatile memory.

According to certain embodiments, the second processor 550 is a component capable of performing operations or data processing related to control and/or communication of individual components of the second electronic device 500, and may be operably, functionally, and/or electrically connected to the components of the second electronic device 500 including the second display 510, the second communication interface 540, and the second memory 530. The second processor 550 may execute various applications through an operating system (e.g., Windows) independent of the first electronic device.

According to certain embodiments, the second processor 550 may identify a connection with the first electronic device (e.g., first electronic device 400 in FIG. 4) through the second communication interface 540. The second processor 550 may receive, from the connected first electronic device 400, a list of applications installed in the first electronic device 400, and may display icons corresponding respectively to the applications on the second display 510 on the basis of the list.

Figure 6A:
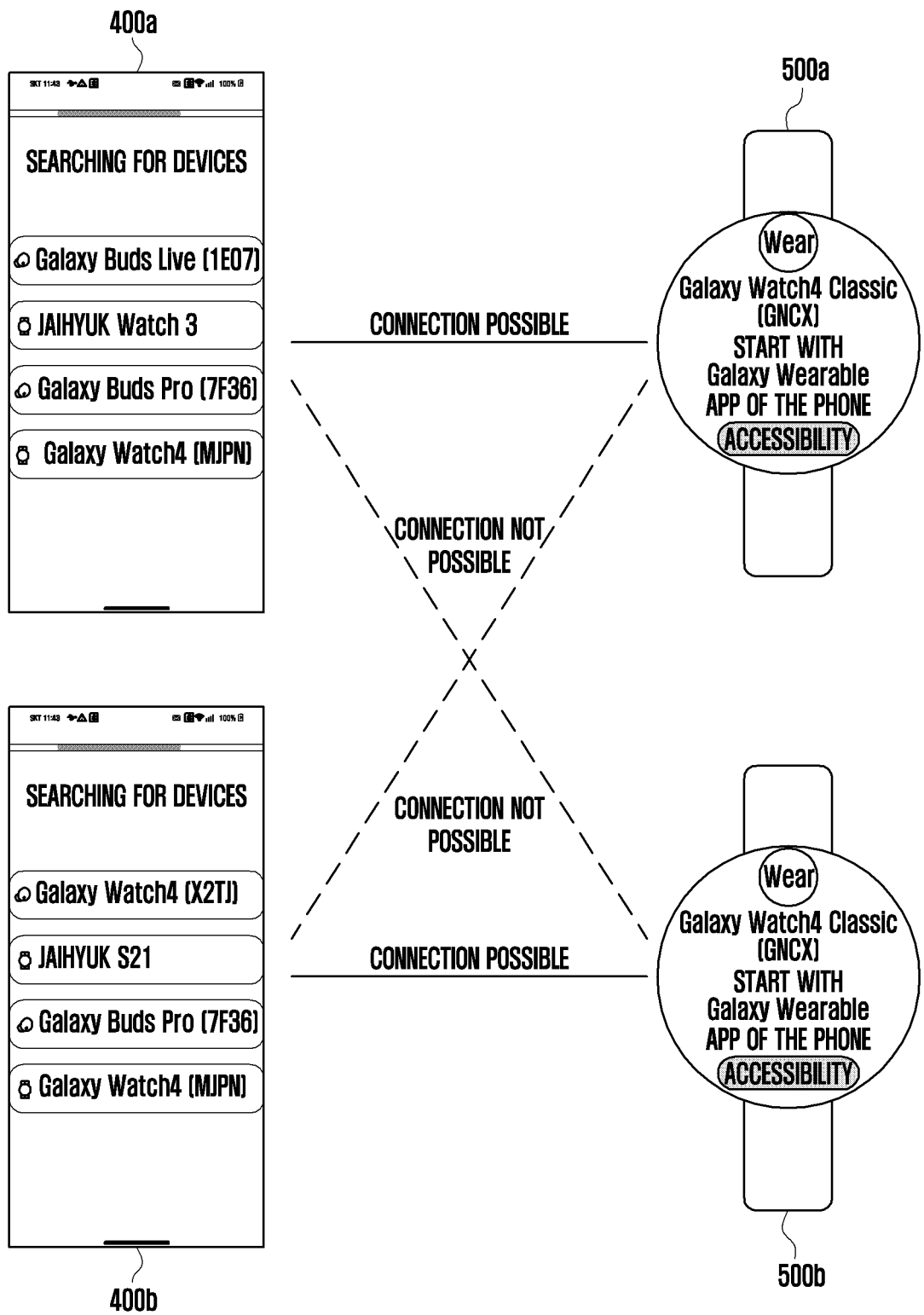
FIGS. 6A to 6C are diagrams depicting a cross-connection situation of electronic devices and a method for preventing the same according to certain embodiments.
Figure 6B:
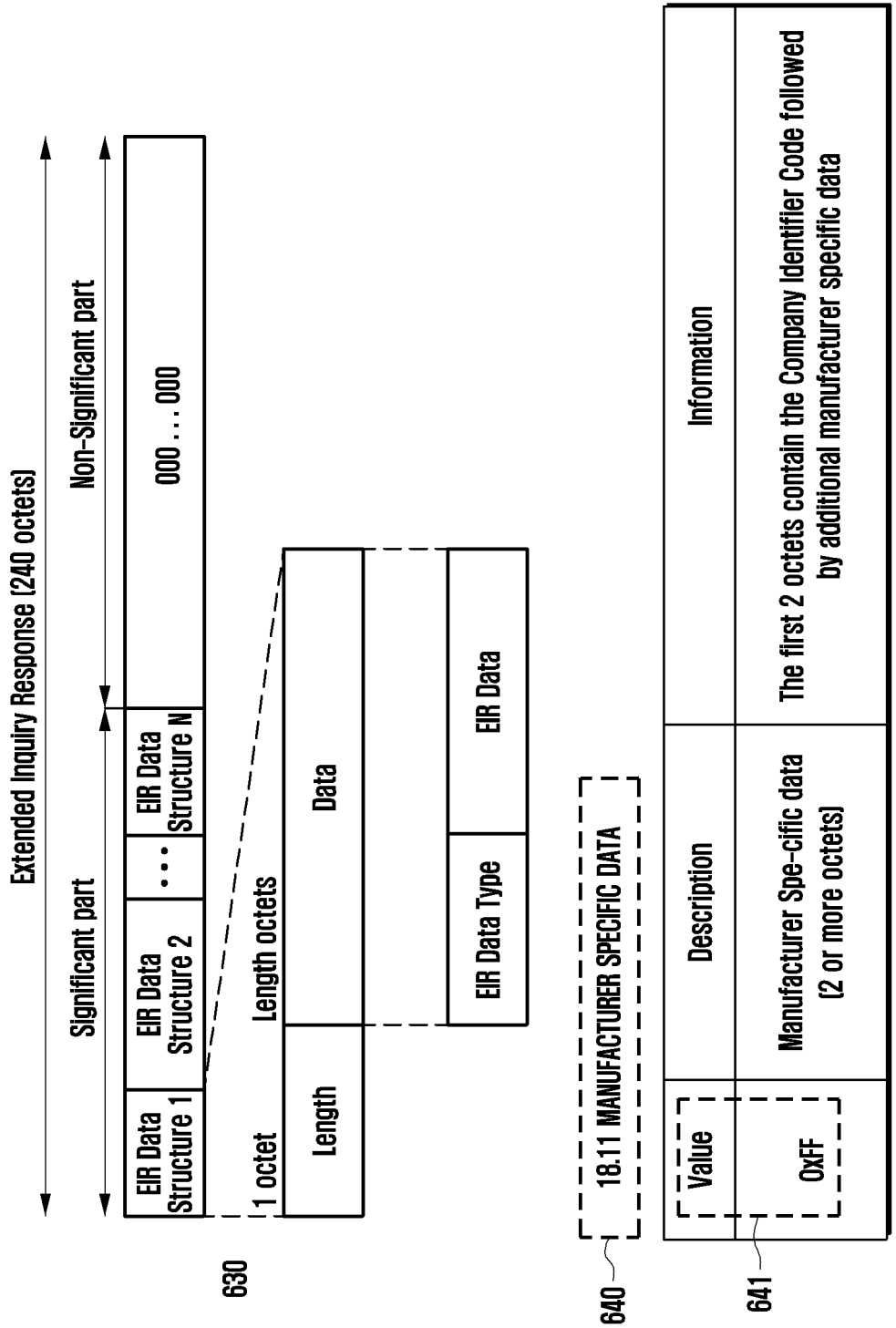
Figure 6C:
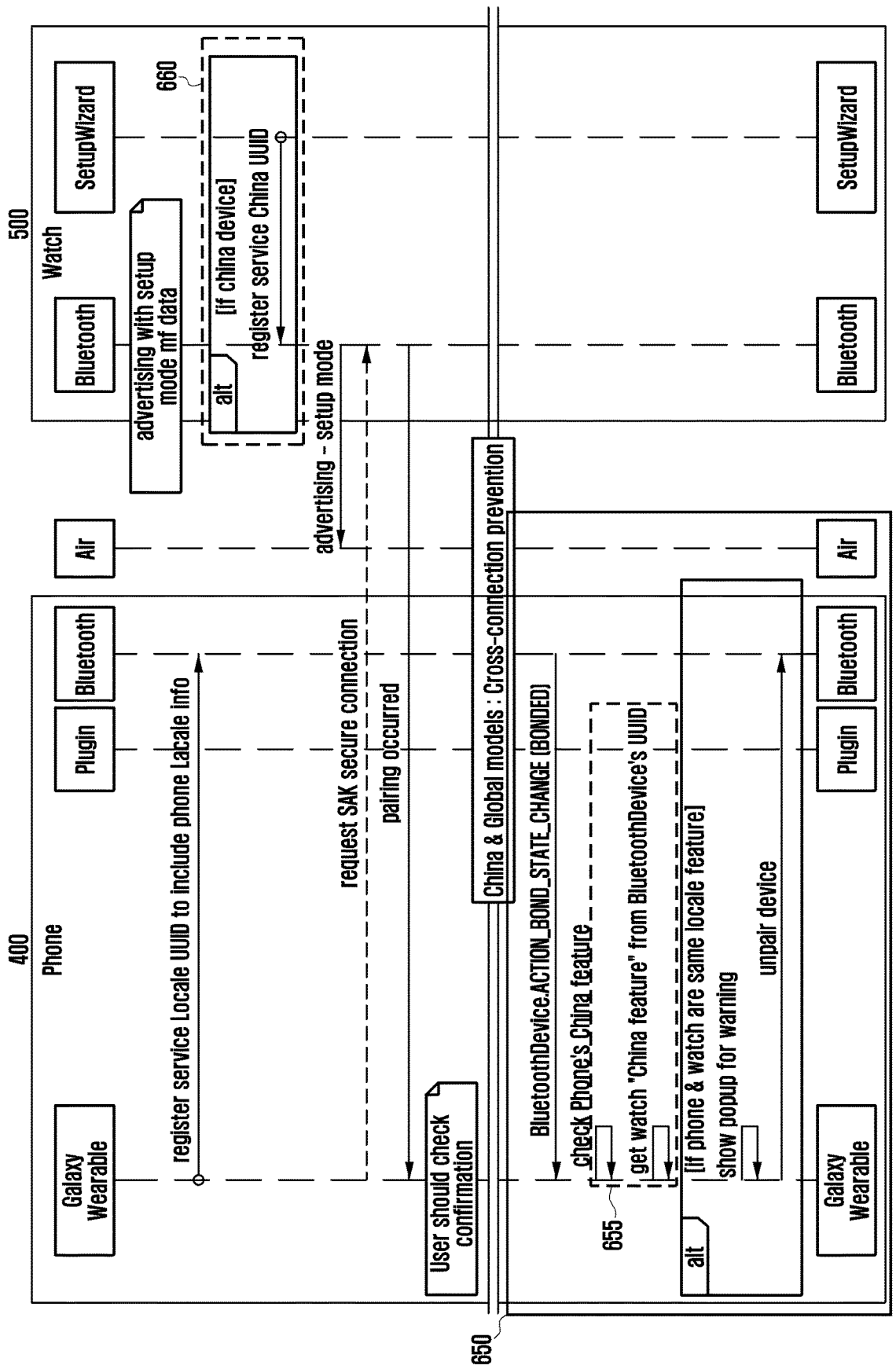

FIGS. 6A to 6C are diagrams depicting a cross-connection situation of electronic devices and a method for preventing the same according to certain embodiments.

A related-art China-specific mobile terminal does not have Global Mobile Service (GMS) installed therein, it has difficulty in connecting to Wear OS on a wearable device, and it can be connected to a China-specific wearable device. However, although cross-connection is not actually made, it is displayed on the screen as if cross-connection is made when a China-specific mobile terminal and a wearable device installed with GMS try to connect, which may cause the user to have an expectation of connection and repeatedly make a connection attempt.

According to an embodiment of FIG. 6A, the first electronic device (e.g., electronic device 400 in FIG. 4) may include a geographically-particular terminal, such as a China-specific terminal 400a and another geographically-particular terminal, such as a non-China-specific terminal 400b. The second electronic device (e.g., electronic device 500 in FIG. 5) may include a China-specific smartwatch 500a and anon-China-specific smartwatch 500b. The China-specific terminal 400a can be connected to the China-specific smartwatch 500a, but may be unable to connect to the non-China-specific smartwatch 500b. Similarly, a connection between the China-specific smartwatch 500a and the non-China-specific terminal 400b may not be possible. However, a list of other devices may be displayed on the electronic device. This list may include the incompatible devices as if being loaded for a potential connection, so that the user may develop a false expectation of connection, even though a connection is not actually possible.

According to certain embodiments of this disclosure, the second electronic device 500, while executing a setup mode, may register a current locale information (e.g., China) of the second electronic device 500 in a universally unique identifier (UUID). The universally unique identifier (UUID) may refer to a standard protocol for creating an ID that is guaranteed to be unique on a network. The universally unique identifier can be used to ensure the uniqueness of an ID issued by a system in a distributed computing environment where there is no central management system. After registering the locale information 660 in the universally unique identifier, the second electronic device 500 may enter a state in which it is discoverable by the first electronic device 400. Thereafter, the first electronic device 400 may perform a pairing operation for establishing a connection with the second electronic device 500. The first electronic device 400 may obtain a universally unique identifier (UUID) supported on the second electronic device 500, using a service discovery process operative as part of the pairing process. The service discovery process may refer to automatically discovering devices and services on a computer network or a database. The first electronic device 400 may automatically discover a network without a complicated process using the service discovery process.

The first electronic device 400, after receiving the universally unique identifier (UUID) 650 including the locale information 655 of the second electronic device 500, may identify the locale information 655 of the second electronic device 500 before connecting data interfaces. Also, the first electronic device 400 may identify whether a connection is possible, using the received locale information of the second electronic device 500 and the locale information of the first electronic device 400 (e.g., by comparison and matching). If a connection cannot be made owing to a difference in locale information 655, the first electronic device 400 may provide a guide the user to pertinent to such a situation. The second electronic device 500 may release the connection with the first electronic device 400 in advance to preclude an unnecessary APK (Android application package) download.

With reference to FIG. 6B, the second electronic device 500 may register locale information in the equipment identity register (EIR) of the second electronic device 500 instead of a universally unique identifier (UUID). After registering the locale information in the equipment identity register, the second electronic device 500 may enter a state in which it is discoverable on the first electronic device 400. The first electronic device 400 may identify the locale information in the equipment identity register of the second electronic device 500 in the discovery stage before pairing. Alternatively, the first electronic device 400 may identify locale information included in manufacturer information 640 (rather than UUID or EIR) of the second electronic device 500 in the discovery stage before pairing. The manufacturer information 640 may include a memory address having a first field 641 set to a value of '0xFF', may include a field that can be discretionally defined at the time of manufacture. The manufacturer may enter locale information of the second electronic device 500 at the indicated address, and the first electronic device 400 may identify the manufacturer information 640 and locale information of the second electronic device 500. The first electronic device 400 may identify whether a connection can be made by using the locale information of the second electronic device 500 and the locale information of the first electronic device 400. If a connection cannot be made owing to a difference in locale information 655, the first electronic device 400 may guide the user to such a situation. If a connection cannot be made with the first electronic device 400, the second electronic device 500 may guide the user to such a situation and release the connection to stop the pairing process. The second electronic device 500 may release the connection with the first electronic device 400 in advance, to thereby prevent an unnecessary download of an APK (Android application package).

According to an embodiment, when a connection cannot be made with the second electronic device 500, the first electronic device 400 may release the connection with the second electronic device 500, and display a guide user interface element indicating that connection with the second electronic device 500 is not possible.

Figure 7:
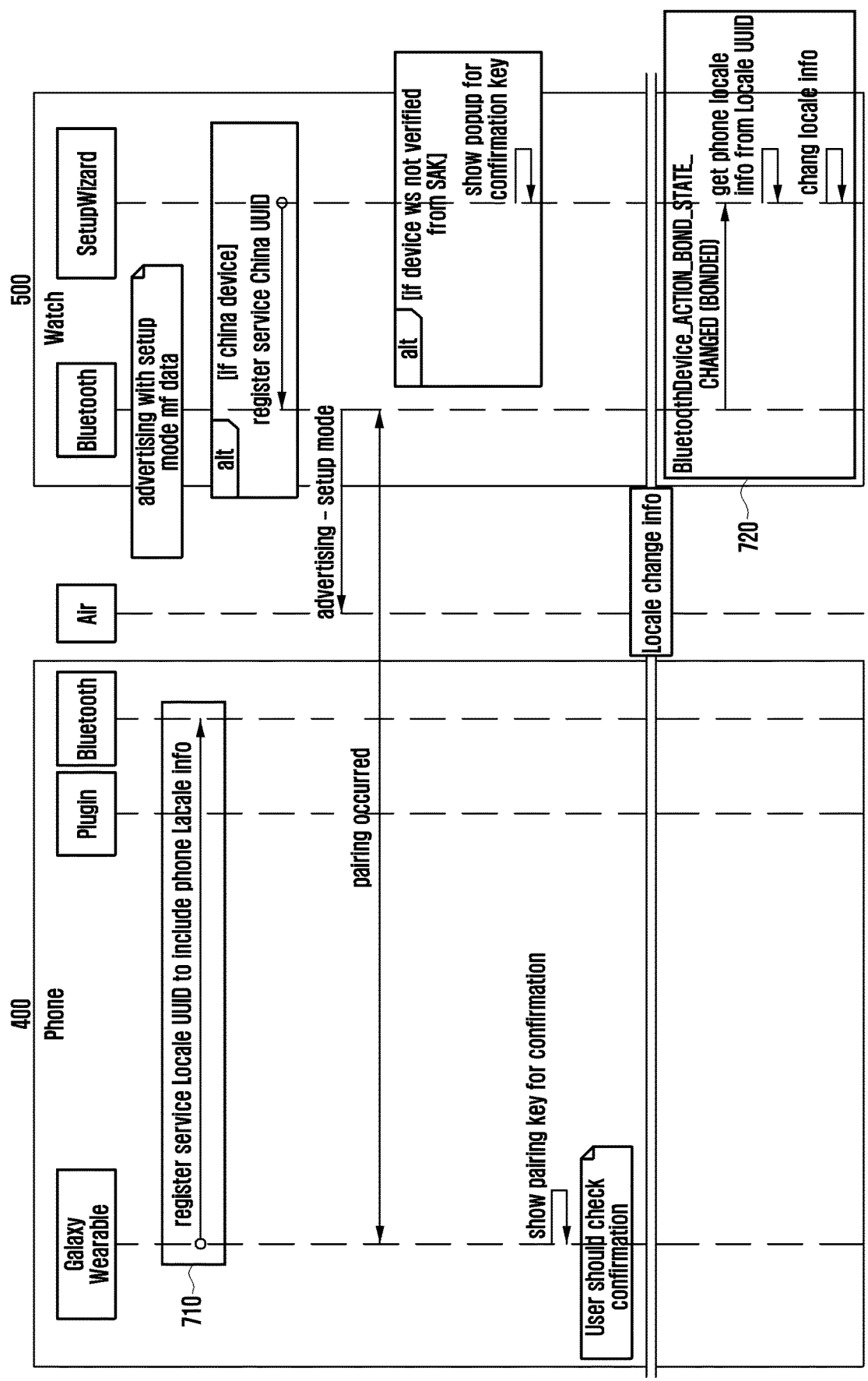
FIG. 7 depicts a process of initial connection between electronic devices according to certain embodiments.

FIG. 7 depicts a process of initial connection between electronic devices according to certain embodiments.

According to an embodiment, after the data interface between the mobile terminal and the wearable device is connected, language information on a universally unique identifier (UUID) of the wearable device may be transmitted. In this case, the language information on the universally unique identifier includes information affecting the entire process of the mobile terminal; when the corresponding information is applied, the entire process may be reset and the communicative connection between the mobile terminal and the wearable device may be released.

According to an embodiment, the first electronic device 400 may newly generate a universally unique identifier (UUID), including language information of the first electronic device 400, prior to pairing. The newly generated universally unique identifier (UUID) may include a fixed part and a language part. The first electronic device 400 may convert the language part into a hexadecimal value when the application is executed. The hexadecimal value may mean a hexadecimal notation. The first electronic device 400 may generate a local universally unique identifier (local UUID) 710 by using the hexadecimal value.

After registering the language information in a universally unique identifier, the first electronic device 400 may perform a discovery process for connection with the second electronic device 500. Thereafter, the first electronic device 400 may perform a pairing process for connection with the second electronic device 500. The second electronic device 500 may obtain a universally unique identifier (UUID) supported on the first electronic device 400, using a service discovery process 720 included in the pairing process. The service discovery process 720 may refer to a process of automatically discovering devices and services on a computer network or a database. The second electronic device 500 may automatically find a network without a complicated process by using the service discovery process 720.

The second electronic device 500 may parse the universally unique identifier (UUID) supported on the first electronic device 400, prior to actually connecting the data interface with the first electronic device 400. Parsing may refer to an operation of extracting desired data from some data in a specific pattern or order. The second electronic device 500 may extract language information from the universally unique identifier (UUID) supported on the first electronic device 400. The second electronic device 500 may apply the language information extracted prior to actually connecting the data interface with the first electronic device 400. The second electronic device 500 may apply the language information to the system first and then connect the data interface. Executing these processes in this order can prevent release of the connection caused by re-execution of the entire process, when the language information is applied.

Figure 8A:
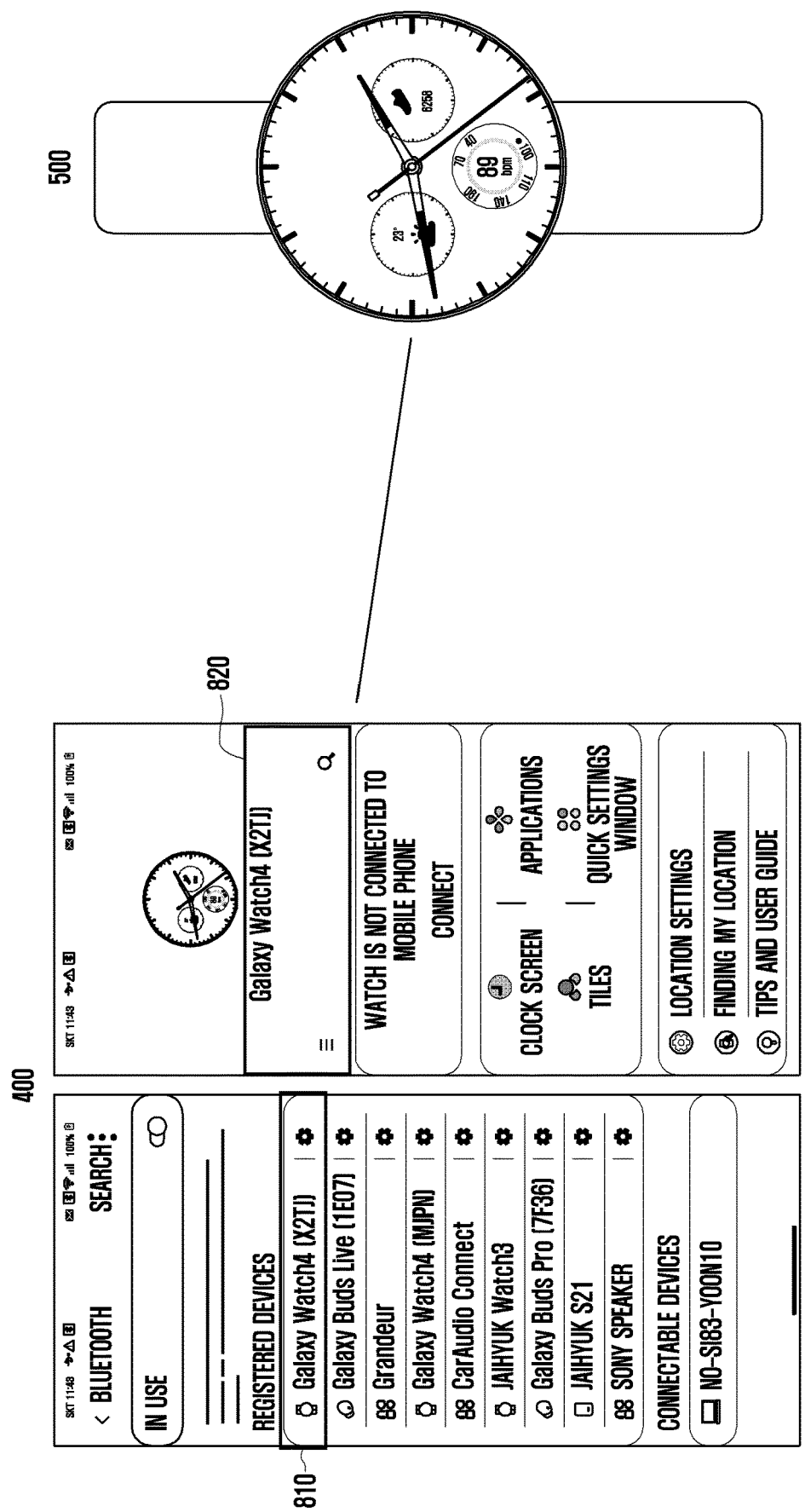
FIGS. 8A and 8B illustrate a problem in which a connection is not made when an electronic device is reset according to an embodiment.
Figure 8B:
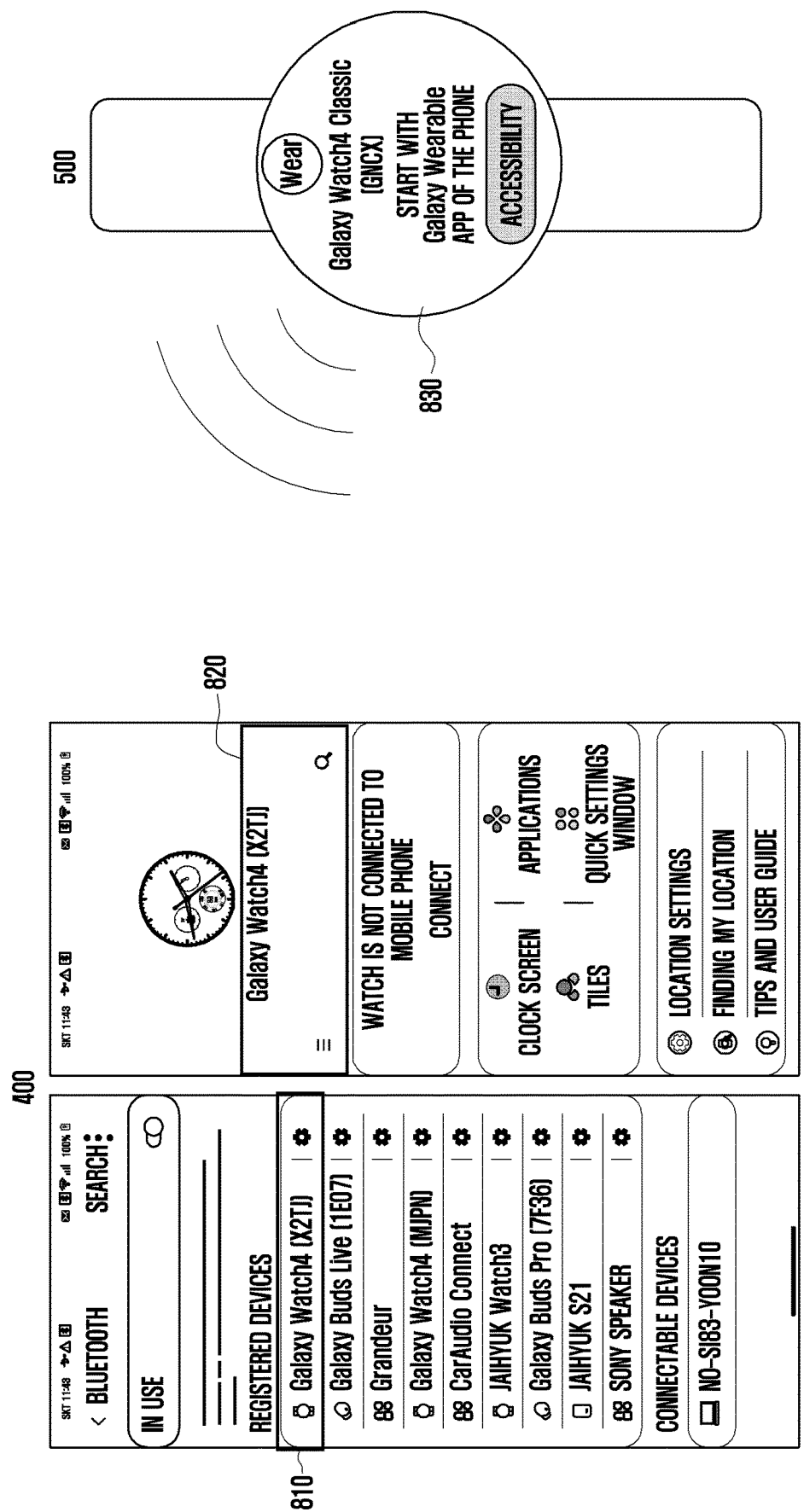
Figure 8C:
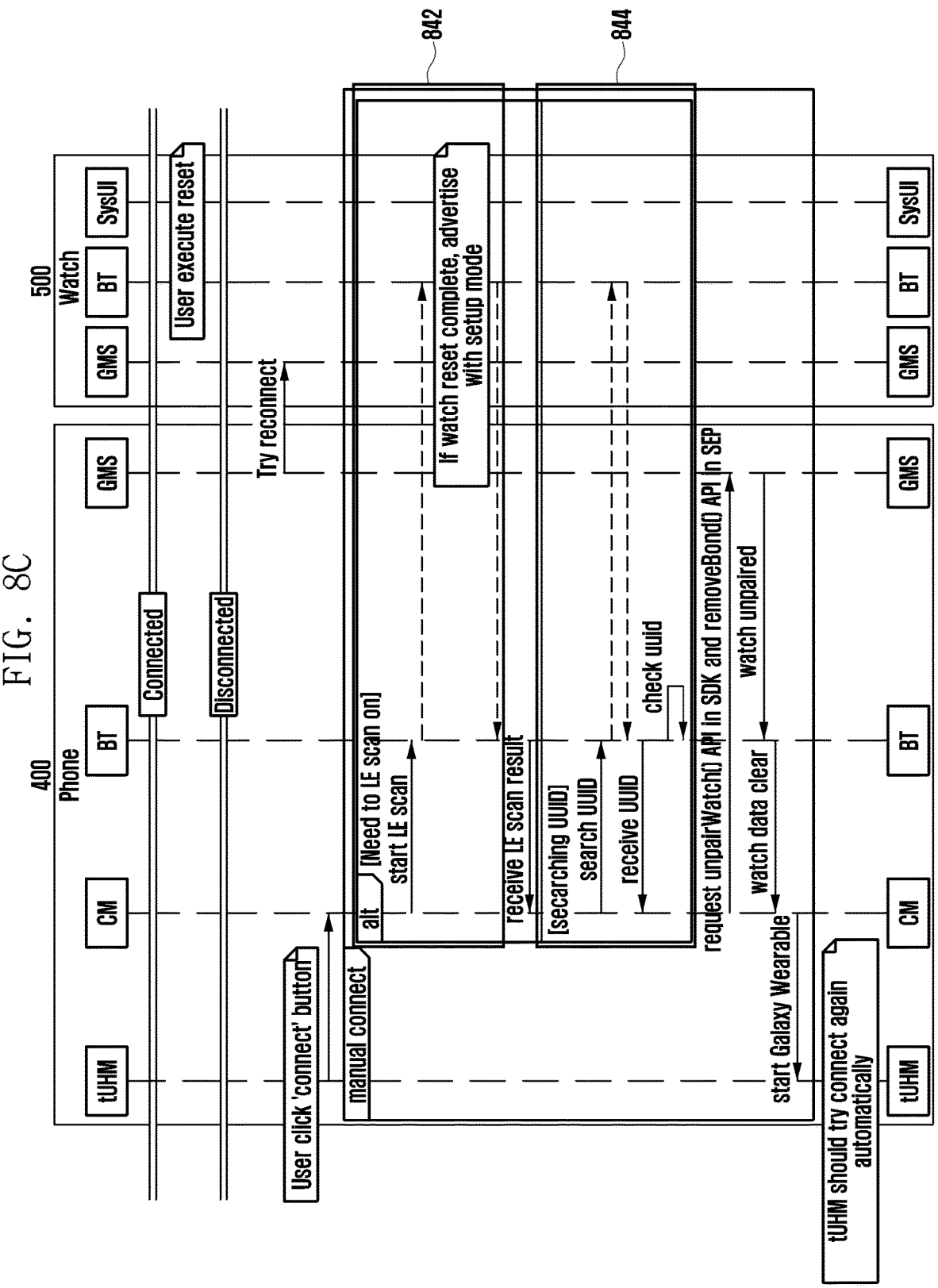
FIG. 8C illustrates a solution process for the problem.

FIGS. 8A and 8B illustrate a problem in which a connection is not established, when an electronic device is reset according to an embodiment, and FIG. 8C illustrates a solution process for the problem.

According to an embodiment, when the wearable device is reset and the mobile terminal is not reset while the wearable device and the mobile terminal are connected, the mobile terminal may not detect that the wearable device is reset. In this case, to reconnect the wearable device and the mobile terminal, the mobile terminal will often need to be reset, and the connection process will likewise need to be reperformed. However, when the mobile terminal fails to recognize that the wearable device has been reset, it may likewise fail to reperform the connection process. FIGS. 8A and 8B are diagrams depicting such a connection situation. In FIGS. 8A to 9B, the first electronic device 400 may be a smartphone, and the second electronic device 500 may be a smartwatch.

With reference to FIG. 8A, the first electronic device 400 and the second electronic device 500 may be wirelessly connected. In this case, the second electronic device 500 may be discovered from a wireless connection list 810 on the first electronic device 400. In addition, on the first electronic device 400, the state of the second electronic device 500 (e.g., battery state, charging state, and display state) may be identified.

With reference to FIG. 8B, when the first electronic device 400 and the second electronic device 500 are wirelessly connected, the second electronic device 500 is reset while the first electronic device 400 is not. When the second electronic device 500 is reset, it may be difficult to maintain a connection between the first electronic device 400 and the second electronic device 500 via a data interface. As a result, the first electronic device 400 and the second electronic device 500 would need to restart the pairing process to reestablish a connection. However, since the first electronic device 400 cannot detect the resetting of the second electronic device 500, the first electronic device 400 does not execute with the reconnection process, and the user may have to manually release (e.g., unpair) the existing connection, and proceed with the reconnection process.

According to an embodiment, the first electronic device 400 may transmit a connection request to the second electronic device 500. When the connection state of the second electronic device 500 is reset, the first electronic device 400 fails to recognize this state, and may be manually connected in a Bluetooth low energy (BLE) state. Bluetooth low energy (BLE) is a type of Bluetooth connection standard, and has a short connection latency, which may be suitable for IoT devices whose connections are frequently disconnected and reconnected. The first electronic device 400, while in BLE connection state, may perform service discovery on the network. The service discovery process may include automatically discovering devices and services on a computer network or a database. The first electronic device 400 may automatically find a network without a complicated process by using the service discovery process.

According to an embodiment, the first electronic device 400 may identify a universally unique identifier (UUID) of the second electronic device 500 among services on the network. The first electronic device 400 may identify the service to determine whether the universally unique identifier (UUID) is a universally unique identifier (UUID) registered during setup and/or whether a universally unique identifier (UUID) registered during usage does not exist. If the universally unique identifier (UUID) is a universally unique identifier (UUID) registered during setup and/or if there is no universally unique identifier (UUID) registered during usage, the first electronic device 400 may determine that the second electronic device 500 is in setup mode. In this case, the first electronic device 400 may delete (unpair) the connection and Bluetooth information with the second electronic device 500 and attempt the initial connection again. Instead of the user being prompted to perform reconnection manually, the first electronic device 400 may identify the state of the second electronic device 500 and automatically attempts reconnection in an embodiment of this disclosure.

With reference to FIG. 8C, the first electronic device 400 may identify a universally unique identifier (UUID) of the second electronic device 500 (844). Alternatively, the first electronic device 400 may determine whether the second electronic device 500 is operating in a setup mode by identifying the BLE data (842).

According to an embodiment, the processor 440 may delete previously stored Bluetooth information of the external device 500, and control the external device 500 to remain in disconnected (i.e., unpaired) state.

According to an embodiment, the processor 440 may control a pairing process for initial connection with the electronic device 400 to be executed on the external device 500.

According to an embodiment, the processor 440 may receive an equipment identity register (EIR) or manufacturer information by using the communication module 420.

According to an embodiment, the processor 440 may identify whether the universally unique identifier (UUID) of the external device 500 is of a first type registered during initial setup, or of a second type registered during usage based on the received equipment identity register (EIR) or manufacturer information, and may determine that the external device 500 is in setup mode if the universally unique identifier (UUID), equipment identity register (EIR), or manufacturer information of the external device 500 corresponds to the first type registered during initial setup.

Figure 9A:
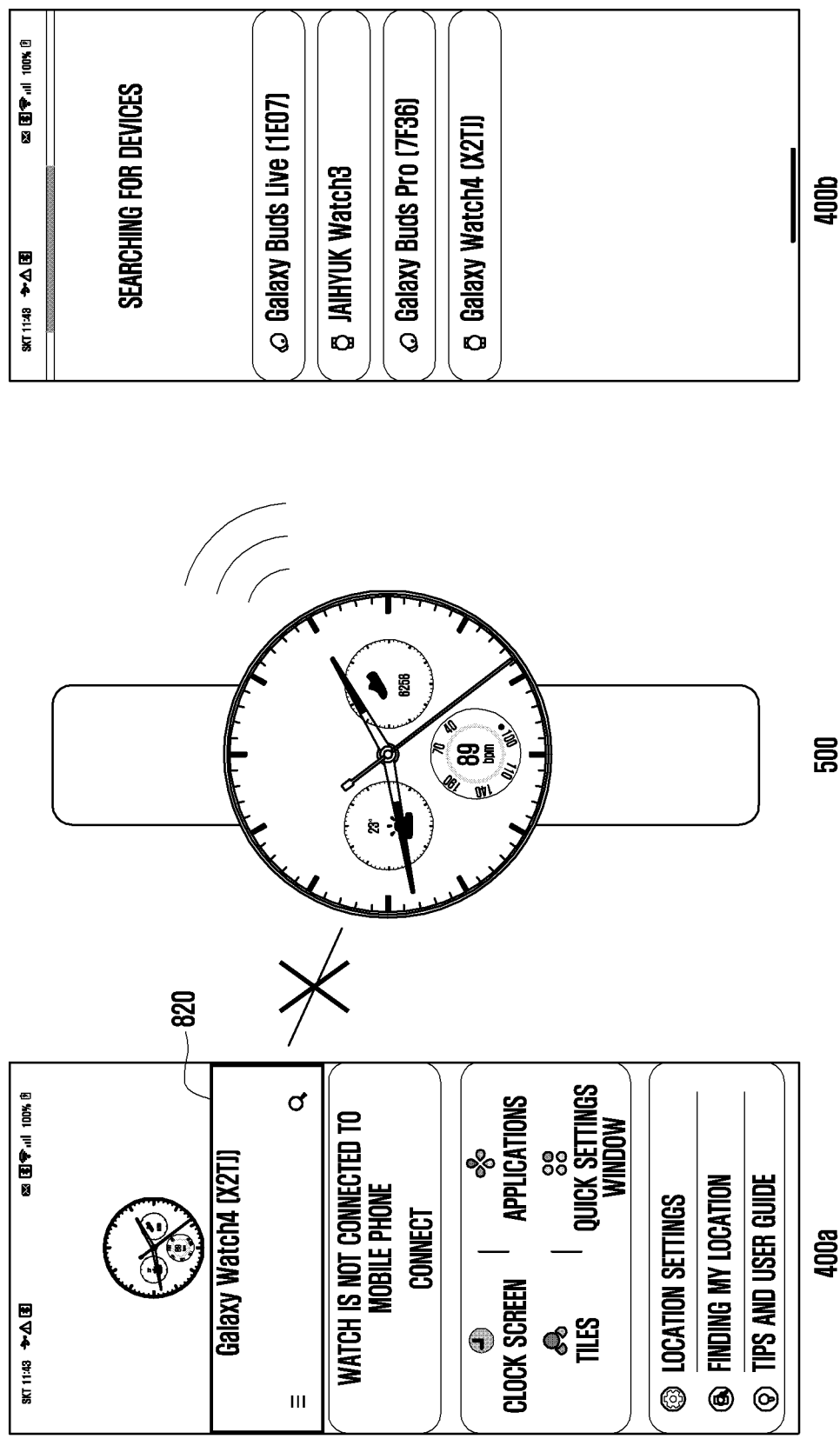
FIGS. 9A and 9B illustrate a situation in which, when an attempt is made to connect an electronic device to another electronic device without resetting the electronic device, the electronic device can be discovered but a connection is not made according to an embodiment.
Figure 9B:
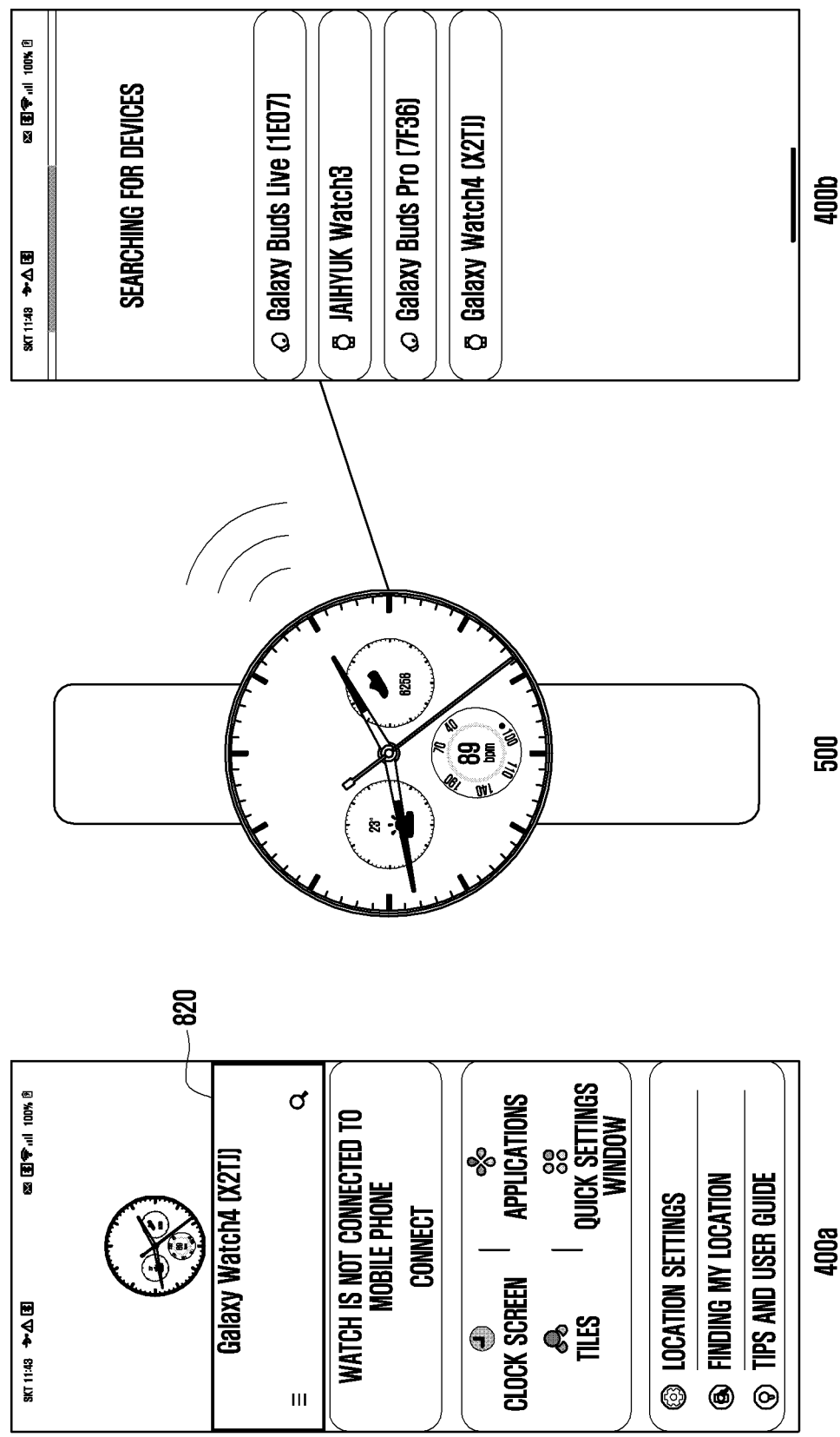

FIGS. 9A and 9B illustrate a situation in which, when an attempt is made to connect an electronic device to another electronic device without resetting the electronic device, the electronic device can be discovered but a connection is not made according to an embodiment.

According to an embodiment, in a state where the wearable device and the mobile terminal are connected, when an attempt is made to connect the wearable device to a new mobile terminal without releasing the existing connection, because the BLE (Bluetooth low energy) address is different, the wearable device may be discovered, but may not be actually connected in the new mobile terminal.

With reference to FIG. 9A, the second electronic device 500 may be connected to a first terminal 400*a*. The second electronic device 500 may initiate a connection attempt to a new second terminal 400*b* without releasing the connection with the first terminal 400*a*. Hereinafter, the first terminal 400*a* and the second terminal 400*b* may be one of first electronic devices 400 in FIG. 4. The second electronic device 500 may be connected to the first terminal 400*a* at a basic rate/enhanced data rate (BR/EDR). BR/EDR (basic rate/enhanced data rate) is a type of Bluetooth communication (Bluetooth classic) and has a relatively short coverage, and continuous connection can be made.

In FIG. 9B, the second electronic device 500 may initiate a connection attempt to the new second terminal 400*b*. In this case, as the Bluetooth low energy (BLE) address is different between the second electronic device 500 and the second terminal 400*b*, it may be difficult to form a data interface between them and connect them. In some situations, the user may discover the second electronic device 500 on the second terminal 400*b*, but the connection is not automatically established. Rather, it is established after the user manually resets the second electronic device 500, after which the second electronic device 500 and the second terminal 400*b* may be connected.

The first electronic device 400 according to an embodiment may transmit a reset request to the second electronic device 500 in case that the second electronic device 500 is present in the search list but a connection is not made because it is found as BLE (Bluetooth low energy). The first electronic device 400 may determine whether the second electronic device 500 is in auto connection mode by using advertising data even in a state where it is not connected to the second electronic device 500. The auto connection mode may refer to a mode in which a Bluetooth connection remains un-reset and thus a connection is automatically made to an electronic device that has been previously connected. When the connection with the first electronic device 400 (e.g., first terminal 400*a*) is not reset, the second electronic device 500 may remain in auto connection mode.

The new first electronic device 400 (e.g., second terminal 400*b*) may recognize the auto connection mode of the second electronic device 500 by using advertising data, and may transmit a reset request to the second electronic device 500. Upon receiving the reset request, the second electronic device 500 may induce a user's reset by using a guide screen (e.g., pop-up screen). Instead of requiring a user to perform a reset by considering the device connected to the second electronic device 500 and identifying the connection reset state; according to an embodiment of this disclosure, the new first electronic device 400 can recognize the auto connection mode of the second electronic device 500 and induce a user's reset by using a guide screen (e.g., pop-up screen). Thereby, the user can more easily identify the connection status between devices and can conveniently initiate a reset.

According to an embodiment, the processor 440 may control a guide for requesting a reset of the external device 500 to be displayed on the display 510 of the external device 500.

According to an embodiment, the processor 440 may detect the connection state of the external device 500 and whether the external device 500 is reset.

According to an embodiment, when the connection state of the external device 500 is reset, the processor 440 may to control the external device 500 to be operably connected to the electronic device 400 by using the communication module 420.

According to an embodiment, the electronic device 400 may further include a display 410, and when the connection state of the external device 500 is reset, the processor 440 may control the display 410 to display a guide screen asking whether to proceed to make a connection to the external device 500.

FIGS. 10 to 13 are flowcharts of a method for an electronic device to connect to an external device.

Figure 10:
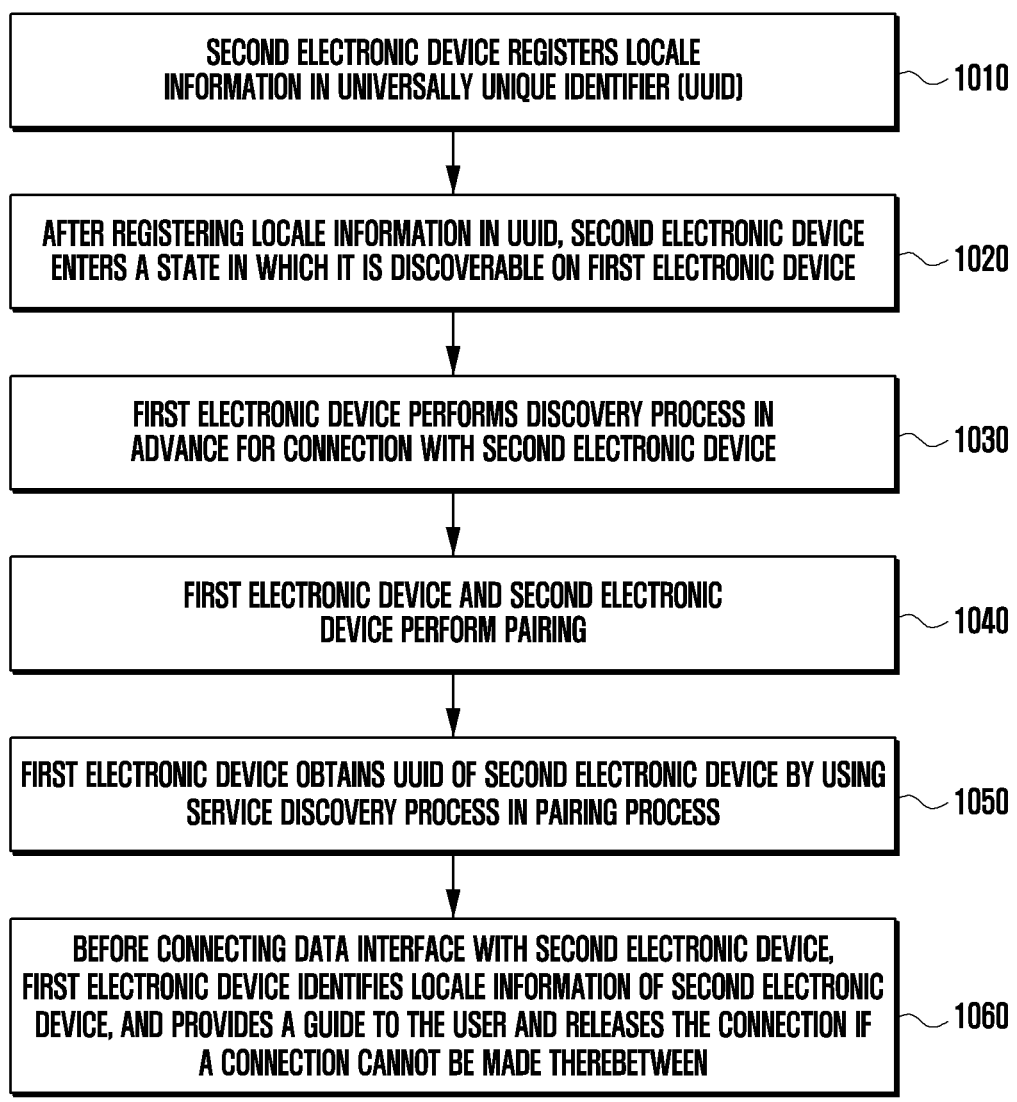
FIG. 10 is a flowchart illustrating an operation for preventing a cross-connection between electronic devices according to certain embodiments.

FIG. 10 is a flowchart illustrating an operation for preventing a cross-connection between electronic devices according to certain embodiments.

At operation 1010, the second electronic device (e.g., electronic device 500 in FIG. 5), while operating in setup mode, may register locale information in a universally unique identifier (UUID). The universally unique identifier (UUID) may refer to a standard protocol for creating an ID that is guaranteed to be unique on a network. The universally unique identifier can be used to ensure the uniqueness of an ID issued by a system in a distributed computing environment where there is no central management system.

After registering the locale information in the universally unique identifier, at operation 1020, the second electronic device 500 may enter a state in which it is discoverable on the first electronic device (e.g., electronic device 400 in FIG. 4). Thereafter, at operation 1030, the first electronic device 400 may perform in advance a discovery process for connection with the second electronic device 500. At operation 1040, the first electronic device 400 may perform a pairing process for connection with the second electronic device 500. At operation 1050, the first electronic device 400 may obtain a universally unique identifier (UUID) supported on the second electronic device 500 by using a service discovery process included in the pairing process. The service discovery process may refer to a process of automatically discovering devices and services on a computer network or a database. The first electronic device 400 may automatically find a network without a complicated process by using the service discovery process.

Thereafter, at operation 1060, the first electronic device 400, which has obtained the universally unique identifier (UUID) 650 including the locale information 655 of the second electronic device 500, may identify the locale information 655 of the second electronic device 500 before actually connecting data interfaces. Also, the first electronic device 400 may identify whether a connection can be made by using the locale information of the second electronic device 500 and the locale information of the first electronic device 400 (e.g., to determine whether a match exists). If a difference is detected in the locale information 655, it is determined that a connection cannot be made owing to the difference, and the first electronic device 400 may display a notification to inform the user of the situation, and release the connection to terminate the pairing process. The first electronic device 400 may release the connection with the second electronic device 500 in advance to thereby prevent unnecessary APK (Android application package) download.

Figure 11:
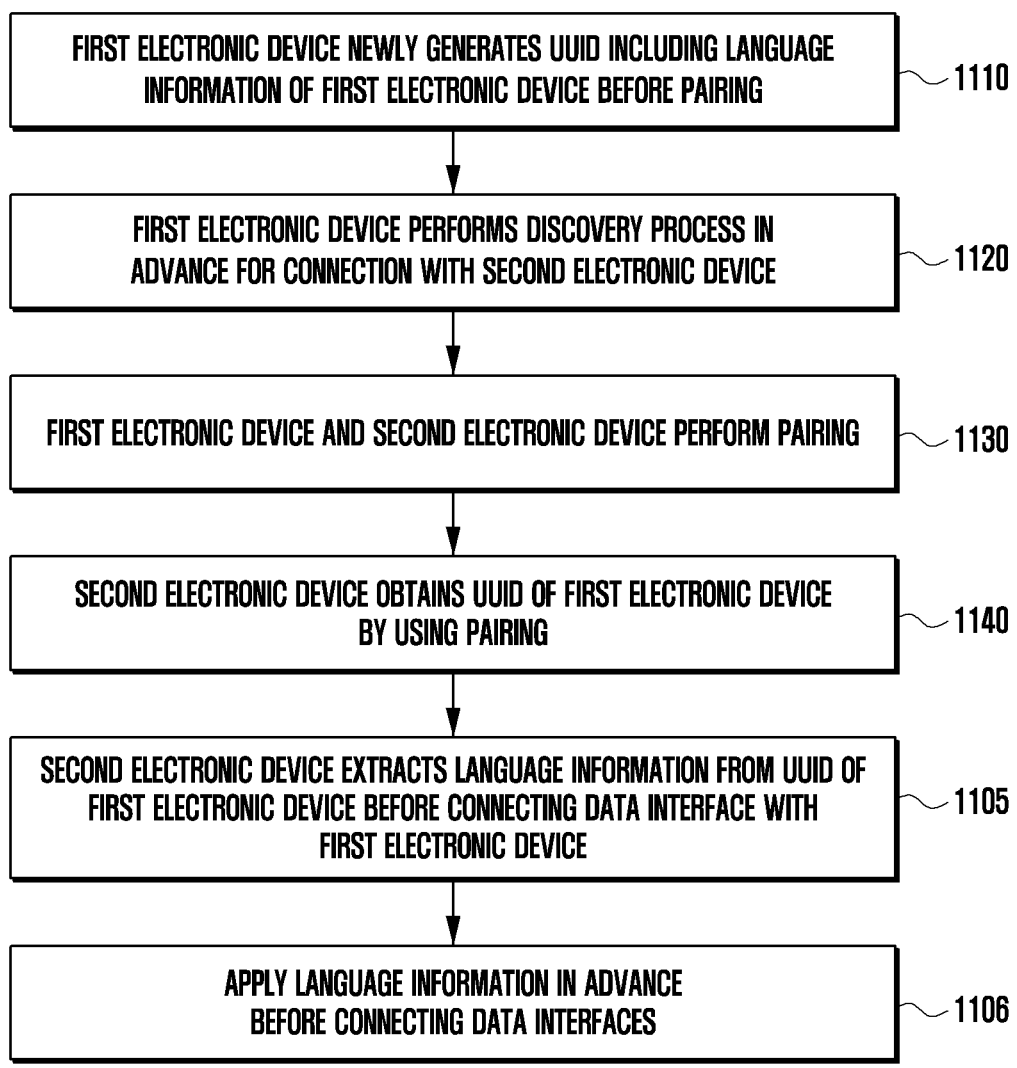
FIG. 11 is a flowchart illustrating an operation of preventing an initial release of connection between electronic devices according to certain embodiments.

FIG. 11 is a flowchart illustrating an operation of preventing an initial release of connection between electronic devices according to certain embodiments.

At operation 1110, the first electronic device 400 may newly generate a universally unique identifier (UUID) including language information of the first electronic device 400 before pairing. The newly generated universally unique identifier (UUID) may include a fixed part and a language part at the end. The first electronic device 400 may convert the language part into a hexadecimal value when the application is executed. The hexadecimal value may mean a hexadecimal notation. The first electronic device 400 may generate a local universally unique identifier (local UUID) by using the hexadecimal value.

After registering the language information in a universally unique identifier, at operation 1120, the first electronic device 400 may execute a discovery process for connection with the second electronic device 500. Thereafter, at operation 1130, the first electronic device 400 may execute a pairing process for connection with the second electronic device 500. At operation 1140, the second electronic device 500 may obtain a universally unique identifier (UUID) supported on the first electronic device 400 by using a service discovery process 720 included in the pairing process. The service discovery process 720 may refer to a process of automatically discovering devices and services on a computer network or a database. The second electronic device 500 may automatically find a network without a complicated process by using the service discovery process 720.

At operation 1150, the second electronic device 500 may parse the universally unique identifier (UUID) supported on the first electronic device 400 before actually connecting the data interface with the first electronic device 400. Parsing may refer to an operation of extracting desired data from some data in a specific pattern or order. Based on the parsing operation, the second electronic device 500 may extract language information from the universally unique identifier (UUID), indicative of a language supported by the first electronic device 400.

At operation 1160, the second electronic device 500 may apply the language information. The language information may be extracted and applied prior to actually connecting the data interface with the first electronic device 400. The second electronic device 500 may apply the language information to the system first, and subsequently establish the connection via the data interface. Executing the processes in this order can prevent release of the connection caused by re-execution of the entire process which is triggered when the extracted language information is applied by the second electronic device 500.

Figure 12:
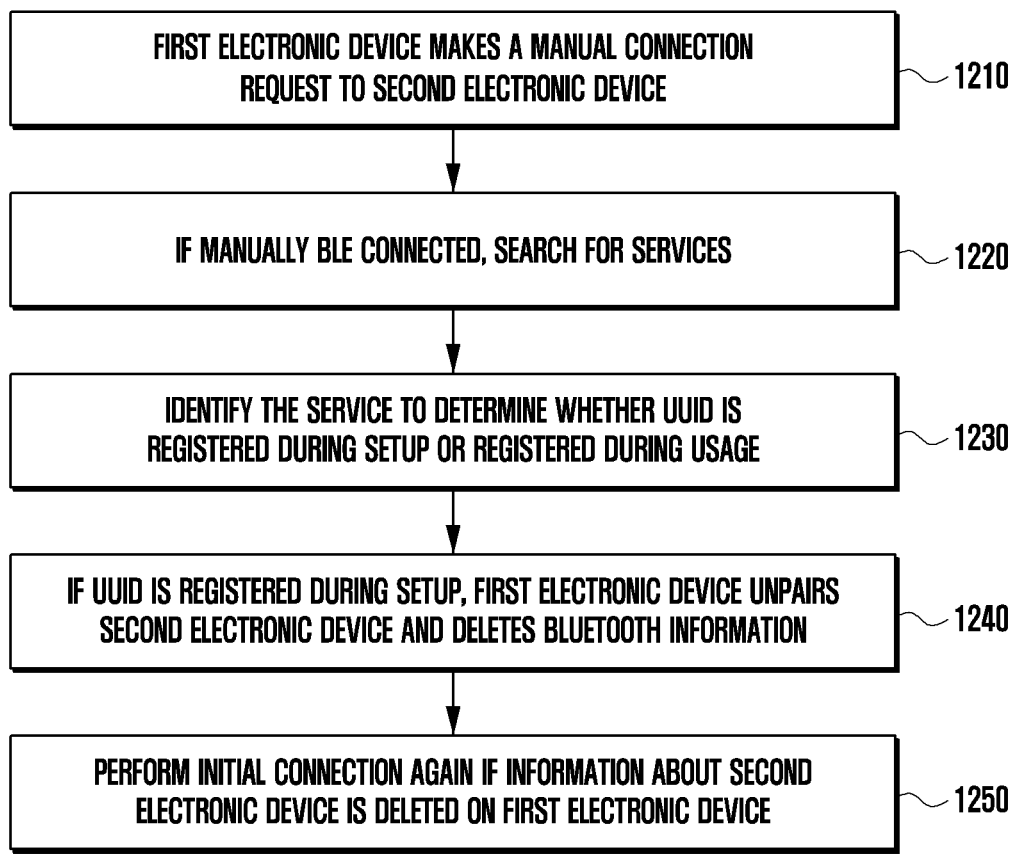
FIGS. 12 and 13 are flowcharts illustrating an automatic reconnection operation performed in response to the connection of one electronic device being reset in a situation where a first electronic device and a second electronic device are connected.
Figure 13:
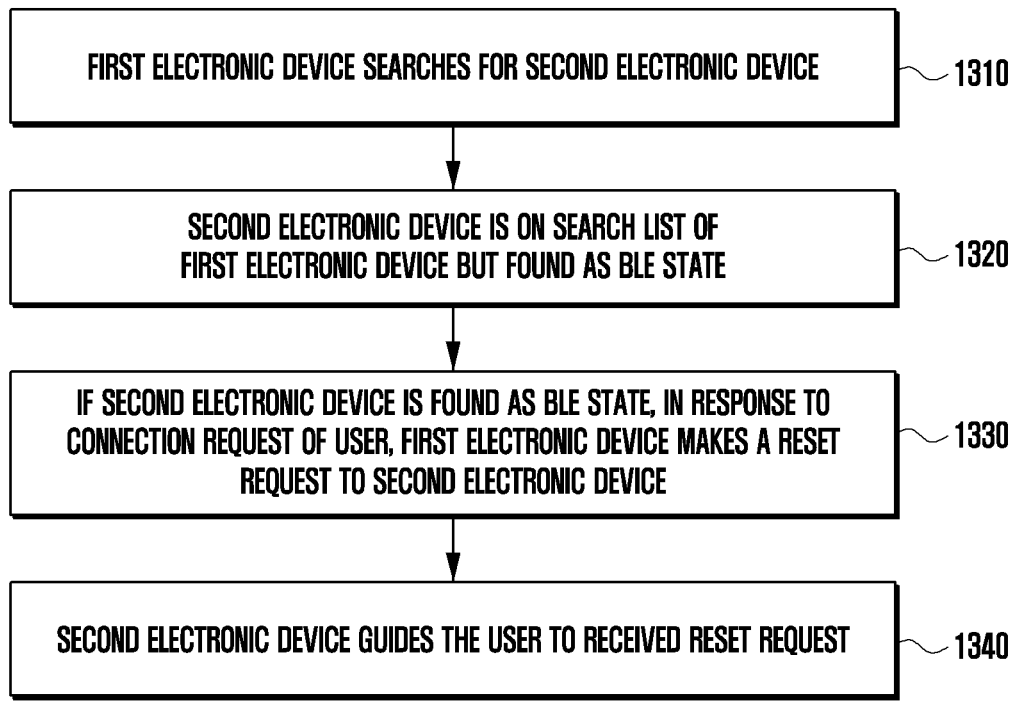

FIGS. 12 and 13 are flowcharts illustrating an automatic reconnection operation performed in response to the connection of one electronic device being reset in a situation where the first electronic device and the second electronic device are connected.

FIG. 12 indicates a situation in which the second electronic device 500 re-executes a connection attempt to the first electronic device 400 when it is reset. At operation 1210, the first electronic device 400 may transmit a connection request to the second electronic device 500. When the connection state of the second electronic device 500 is reset, the first electronic device 400 may not recognize the reset and may be manually connected thereto using a Bluetooth low energy (BLE) state. Bluetooth low energy (BLE) is a type of Bluetooth connection standard and utilizes a short connection latency, and may be suitable for IoT devices whose connections are frequently disconnected and reconnected. At operation 1220, in response to being connected in BLE state, the first electronic device 400 in BLE state may execute a service discovery on the network. The service discovery process may refer to a process of automatically discovering devices and services on a computer network or a database. The first electronic device 400 may automatically find a network without a complicated process by using the service discovery process.

At operation 1230, the first electronic device 400 may identify a universally unique identifier (UUID) of the second electronic device 500 from among available services on the network. The first electronic device 400 may identify the service to determine whether the universally unique identifier (UUID) is a universally unique identifier (UUID) registered during setup, and/or whether a universally unique identifier (UUID) registered during usage does not exist. If the universally unique identifier (UUID) is a universally unique identifier (UUID) registered during setup and/or if there is no universally unique identifier (UUID) registered during usage, the first electronic device 400 may determine that the second electronic device 500 is operating in a setup mode. In this case, at operation 1240, the first electronic device 400 may delete (e.g., unpair) the connection and Bluetooth information with the second electronic device 500, and may reattempt the initial connection operation at operation 1250. Instead of requiring the user to perform reconnection manually, according to an embodiment, the first electronic device 400 may identify the state of the second electronic device 500 and automatically proceed to reconnection in an embodiment of this disclosure.

FIG. 13 describes a situation in which the second electronic device 500 generates an automatic reconnection request when the first electronic device 400 is changed to a new second terminal (e.g., second terminal 400*b* in FIG. 9A) without executing a reset. With reference to FIG. 9A, the second electronic device 500 may be connected to the first terminal 400*a*. The second electronic device 500 may generate a connection attempt to a new second terminal 400*b* without releasing the connection with the first terminal 400*a*. Hereinafter, the first terminal 400*a* and the second terminal 400*b* may be one of first electronic devices 400 in FIG. 4. At operation 1310, the second terminal 400*b* may search for the second electronic device 500. At operation 1320, the second terminal 400*b* may discover the second electronic device 500 but detect that it is operating in a Bluetooth low energy (BLE) state. In this case, as the Bluetooth low energy (BLE) address is different between the second electronic device 500 and the second terminal 400*b*, it may be difficult to establishing a data interface between them and connect them.

According to an embodiment, the second terminal 400*b* may determine whether the second electronic device 500 is in auto connection mode by using advertising data even in a state where it is not connected to the second electronic device 500. The auto connection mode may refer to a mode in which a Bluetooth connection remains un-reset and thus a connection is automatically made to an electronic device that has been previously connected. When the connection with the first electronic device 400 (e.g., first terminal 400*a*) is not reset, the second electronic device 500 may remain in auto connection mode. At operation 1330, the new first electronic device 400 (e.g., second terminal 400*b*) may recognize the auto connection mode of the second electronic device 500 by using advertising data, and may transmit a reset request to the second electronic device 500. At operation 1340, upon receiving the reset request, the second electronic device 500 may prompt a user to initiate a reset by displaying a guide screen (e.g., pop-up screen). Instead of requiring a to perform a reset by manually identifying the device connected to the second electronic device 500 and the connection reset state, according to an embodiment of this disclosure, the new first electronic device 400 can automatically recognize the auto connection mode of the second electronic device 500 and prompt a user to initiate a reset using a guide screen (e.g., pop-up screen). Thereby, the user can more easily identify the connection status between devices and can conveniently initiate a reset.

An electronic device (e.g., electronic device 400 in FIG. 4) according to certain embodiments may include: a display (e.g., display 410 in FIG. 4); a communication module (e.g., communication interface 420 in FIG. 4); and a processor (e.g., processor 450 in FIG. 4), wherein the processor may be configured to: register locale information of the electronic device 400 in a universally unique identifier (UUID), an equipment identity register (EIR), or manufacturer information; deliver, in setup mode through the communication module 420, the universally unique identifier (UUID), equipment identity register (EIR), or manufacturer information to an external device (e.g., electronic device 500 in FIG. 5); and control displaying a guide indicating that connection is not possible when it is difficult to connect the external device 500 and the electronic device 400 in correspondence to the locale information of the electronic device 400.

According to an embodiment, the universally unique identifier may include information on at least one of an identifier (ID) defined to be used during Bluetooth connection, a hands free profile (HFP), or an advanced audio distribution profile (A2DP).

According to an embodiment, the processor may be configured to control the display to display a guide indicating that connection with the external device is not possible.

According to an embodiment, the processor may be configured to: receive a universally unique identifier (UUID) from the external device through the communication module; control extracting language information included in the universally unique identifier (UUID); and control applying the language information before connecting a data interface with the external device.

According to an embodiment, the language information of the electronic device may include information that resets the entire process of the electronic device to thereby reset the connection to the external device.

According to an embodiment, the processor may be configured to control extracting language information by copying the universally unique identifier (UUID) of the external device before connecting the data interface with the external device.

An electronic device according to certain embodiments may include: a display; a communication module; and a processor, in which the processor may be configured to: receive, when making a connection attempt to an external device, a universally unique identifier (UUID), an equipment identity register (EIR), or manufacturer information of the external device through the communication module; control extracting locale information based on the universally unique identifier (UUID), equipment identity register (EIR), or manufacturer information of the external device; release the connection with the external device if it is difficult to connect the external device and the electronic device based on the locale information of the external device; and control displaying a guide indicating that connection with the external device is not possible.

According to an embodiment, the universally unique identifier may include information on at least one of an identifier (ID) defined to be used during Bluetooth connection, a hands free profile (HFP), or an advanced audio distribution profile (A2DP).

According to an embodiment, the processor may be configured to control the display to display a guide indicating that connection with the external device is not possible when it is difficult to connect the external device and the electronic device based on the locale information of the external device.

According to an embodiment, the processor may be configured to control releasing the connection operation without downloading an Android application package (APK) on the external device based on the locale information of the external device.

An electronic device according to certain embodiments may include: a communication module; and a processor, in which the processor may be configured to: make a connection request to an external device through the communication module; search for a service when a BLE (Bluetooth low level) connection is made with the external device; identify whether a universally unique identifier (UUID) of the external device is of a first type registered during initial setup or of a second type registered during usage by using the service; and determine that the external device is in setup mode when the universally unique identifier (UUID) of the external device corresponds to the first type registered during initial setup.

According to an embodiment, the processor may be configured to delete previously stored Bluetooth information of the external device, and control the external device to remain in an unpaired state.

According to an embodiment, the processor may be configured to control a pairing process for initial connection to the electronic device to be executed on the external device.

According to an embodiment, the processor may be configured to receive an equipment identity register (EIR) or manufacturer information by using the communication module.

According to an embodiment, the processor may be configured to identify whether the universally unique identifier (UUID) of the external device is of the first type registered during initial setup or of the second type registered during usage based on the received equipment identity register (EIR) or manufacturer information, and determine that the external device is in setup mode when the universally unique identifier (UUID) of the external device, equipment identity register (EIR), or manufacturer information corresponds to the first type registered during initial setup.

An electronic device according to certain embodiments may include: a communication module; and a processor, in which the processor may be configured to: search for an external device for pairing; and make a connection state reset request to the found external device when the external device is found as BLE (Bluetooth low energy) and it is difficult to find the BR/EDR (basic rate/enhanced data rate) address of the external device.

According to an embodiment, the processor may be configured to control a guide for requesting a reset of the external device to be displayed on the display of the external device.

According to an embodiment, the processor may be configured to detect the connection state of the external device and whether the external device is reset.

According to an embodiment, the processor may be configured to control the external device to be operably connected to the electronic device by using the communication module when the connection state of the external device is reset.

According to an embodiment, the electronic device may further include a display, and the processor may be configured to control the display to display a guide screen asking whether to proceed to make a connection to the external device when the connection state of the external device is reset.

What is claimed is:

1. An electronic device, comprising:
   a display;
   a communication module; and
   at least one processor,
   wherein the at least one processor is configured to:
   prior to initiating communication with external devices, register a geographic locale of the electronic device in a manufacturer information preinstalled during manufacture of the electronic device;
   execute a setup mode, including transmitting, via the communication module the manufacturer information to the external device;
   receive from the external device a confirmation whether connection is possible based on the transmitted manufacturer information including the registered geographic locale; and
   display a guide indicating whether connection is possible based on the received confirmation.

2. The electronic device of claim 1, wherein the guide indicates that connection with the external device is not possible.

3. The electronic device of claim 1, wherein the at least one processor is further configured to:
   receive a UUID from the external device via the communication module;
   extract, from the UUID, language information associated with the external device; and
   configure a user interface of the electronic device based on the extracted language information prior to connecting with the external device via a data interface.

4. The electronic device of claim 3, wherein the language information includes information associated with resetting an entire process of the electronic device so as to reset a connection to the external device.

5. The electronic device of claim 3, wherein
   the language information is extracted by copying the UUID of the external device prior to connecting to the external device via the data interface.

6. An electronic device, comprising:
   a display;
   a communication module; and
   at least one processor,
   wherein the at least one processor is configured to:
   when attempting to communicatively connect to an external device, receive a manufacturer information that is preinstalled to the external device during manufacture of the external device;
   extract locale information for the external device, from the manufacturer information;
   determine whether communicative connection is possible with the external device based on a comparison of the extracted locale information of the external device, and a stored locale information of the electronic device; and
   display, via the display, a guide indicating whether communicative connection with the external device is possible.

7. The electronic device of claim 6, wherein the guide indicates that communicative connection with the external device is not possible when the extracted locale information and the stored locale information mismatch.

8. The electronic device of claim 6, wherein the at least one processor is further configured to:
   when determining that the communicative connection with the external device is not possible, release a connection attempt with the external device in absence of downloading an Android application package (APK) to at least one of the electronic device or the external device.

9. The electronic device of claim 6, wherein the at least one processor is further configured to:
   transmit a connection request to an external device via the communication module;
   based on detecting that a Bluetooth low-energy (BLE) communicative connection is established with the external device, search for a service;
   after detecting the service, executing the service to identify whether a universally unique identifier (UUID) of the external device is of a first type that is registered during initial setup of the external device, or of a second type registered during normal usage of the external device, wherein the initial setup is a configuration process executed automatically upon first power-on of a new device and/or a factory-reset device; and
   when the UUID of the external device corresponds to the first type, determine that the external device is presently operating in an initial setup mode.

10. The electronic device of claim 9, wherein the at least one processor is further configured to delete previously stored Bluetooth information of the external device, so as to cause the external device to remain in an unpaired state.

11. The electronic device of claim 10, wherein the at least one processor is further configured to transmit an instruction to the external device to execute a pairing operation, to establish an initial connection with the electronic device.

12. The electronic device of claim 9, wherein the at least one processor is further configured to receive a transmission of the manufacturer information for the external device, using the communication module.

13. The electronic device of claim 6, wherein the at least one processor is further configured to:
   execute a search for an external device with which to attempt a pairing operation; and
   after detecting an external device via the search, determine that the detected external device is communicable via Bluetooth low-energy (BLE), and that a basic rate/enhanced data rate (BR/EDR) address of the external device is undiscoverable; and
   based on the determination, transmit to the external device a request to reset a connection state.

14. The electronic device of claim 13, wherein the at least one processor is further configured to transmit to the external device a guide for requesting a reset of the external device for display by the external device.

15. The electronic device of claim 13, wherein the at least one processor is further configured to detect a connection state of the external device, and detect whether the external device is reset.

16. The electronic device of claim 13, wherein the at least one processor is further configured to operably connect to the external device via the communication module after detecting that the connection state of the external device is reset.

17. The electronic device of claim 13, further comprising a display, wherein the at least one processor configured to:
 display, via the display, a guide screen querying whether to establish a connection to the external device based on detecting that the connection state of the external device is reset.

\* \* \* \* \*